United States Patent
Guan et al.

(10) Patent No.: US 7,406,235 B2
(45) Date of Patent: Jul. 29, 2008

(54) GRADED-INDEX MULTIMODE FIBER AND MANUFACTURING METHOD THEREFOR

(75) Inventors: Ning Guan, Sakura (JP); Katsuhiro Takenaga, Sakura (JP); Kuniharu Himeno, Sakura (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 10/934,723

(22) Filed: Sep. 7, 2004

(65) Prior Publication Data

US 2005/0053351 A1 Mar. 10, 2005

(30) Foreign Application Priority Data

Sep. 9, 2003 (JP) .............................. 2003-316513
Sep. 30, 2003 (JP) .............................. 2003-342174

(51) Int. Cl.
*G02B 6/02* (2006.01)
(52) U.S. Cl. ...................... 385/124; 385/123; 385/125; 385/126; 385/142; 385/144; 65/419; 264/1.24
(58) Field of Classification Search ........... 385/123–27, 385/142, 144; 65/419; 264/1.24
See application file for complete search history.

(56) References Cited

U.S. PATENT DOCUMENTS

| | | | |
|---|---|---|---|
| 4,082,420 A | | 4/1978 | Shiraishi et al. |
| 4,335,934 A | * | 6/1982 | Black et al. .................. 385/127 |
| 4,372,647 A | * | 2/1983 | Okamoto et al. ............ 385/127 |
| 4,478,622 A | | 10/1984 | Olshansky |
| 4,664,474 A | | 5/1987 | Tanaka et al. |
| 5,702,497 A | * | 12/1997 | Oh et al. ........................ 65/412 |
| 6,529,666 B1 | * | 3/2003 | Dultz et al. .................. 385/127 |
| 2002/0136515 A1 | * | 9/2002 | Schaper et al. .............. 385/124 |
| 2003/0099451 A1 | * | 5/2003 | Walker et al. ................ 385/128 |
| 2003/0118305 A1 | * | 6/2003 | Reed et al. ................... 385/124 |
| 2004/0086245 A1 | * | 5/2004 | Farroni et al. ............... 385/123 |

OTHER PUBLICATIONS

M. Onishi et al., "Dispersion Compensating Fibre with a High Figure of Merit of 250ps/nm/dB", Electronics Letters, IEE Stevenage, GB, vol. 30, No. 2, Jan. 20, 1994, pp. 161-163.
E. A. J.Marcatili, "Modal Dispersion in Optical Fibers with Arbitrary Numerical Aperture and Profile Dispersion", Bell System Technical Journal, American Telephone and Telegraph Co., New York, U.S., vol. 56, No. 1, 1977, pp. 49-64.
O. V. Butov et al., "Refractive Index Dispersion of Doped Silica for Fiber Optics", Optics Communications, North-Holland Publishing Co., Amsterdam, NL, vol. 213, No. 4-6, Dec. 1, 2002, pp. 301-308.
G. Yabre, "Comprehensive Theory of Dispersion in Graded-Index Optical Fibers", Journal of Lightwave Technology, IEEE, new York, U.S., vol. 18, No. 2, Feb. 1, 2000, pp. 166-177.

(Continued)

*Primary Examiner*—James P. Hughes
(74) *Attorney, Agent, or Firm*—Sughrue Mion, PLLC

(57) ABSTRACT

A graded-index multimode fiber includes a core made of silica glass, the core having a central region and an outer peripheral region, and a cladding which is provided at an outer periphery of the core. The central region contains one of germanium and phosphorus, and the outer peripheral region contains fluorine.

10 Claims, 27 Drawing Sheets

OTHER PUBLICATIONS

R. Olshansky, "Propagation in Glass Optical Wavelengths", Review of Modern Physics, vol. 51, No. 2, Apr. 1979.

E. A. J. Marcatili, "Modal Dispersion in Optical Fibers with Arbitrary Numerical Aperture and Profile Disperion", The Bell System Technical Journal, vol. 65, No. 1, pp. 49-63, 1977.

* cited by examiner

GRADED-INDEX MULTIMODE FIBER AND MANUFACTURING METHOD THEREFOR

BACKGROUND OF THE INVENTION

Priority is claimed from Japanese Patent Application No. 2003-316513 filed Sep. 9, 2003, and Japanese Patent Application No. 2003-342174, filed Sep. 30, 2003, the contents of which are incorporated herein by reference.

1. Field of the Invention

The present invention relates to graded-index multimode fibers and to a manufacturing method therefor. More particularly, the present invention relates to graded-index multimode fibers which have a wide transmission bandwidth in a region around the center wavelength and to a manufacturing method therefor.

2. Description of Related Art

Graded-index multimode fibers (hereinafter referred to as "GI multimode fibers"), which are one type of multimode fiber, have a large numerical aperture and have been used for transmission lines of optical local area networks (LAN). Driven by a need for a faster optical LAN, techniques to precisely control refractive index profiles of GI multimode fibers have been improved.

However, further improvement in performance of GI multimode fibers seems impossible at present, and wavelength division multiplexing (WDM) is required in order to increase transmission bandwidth of GI multimode fibers.

In a conventional GI multimode fiber which has a germanium-containing core, however, an optimum refractive index profile varies greatly depending on the wavelength of the light signal propagating through the fiber (see, e.g., R. Olshansky, "Propagation in glass optical waveguides", Review of Modern Physics, Vol. 51, No. 2, April 1979). Accordingly, since a fiber having a refractive index profile optimized at a certain wavelength provides a very small transmission bandwidth at other wavelengths, it cannot be used for wavelength division multiplexing (WDM).

In order to achieve a wide transmission bandwidth and minimize differences in propagation speed among different modes, GI fibers are fabricated so that profiles (refractive index profiles) of these optical fibers have a graded-index profile. Such GI multimode fibers have a larger numerical aperture, and have been widely used in various applications, e.g., the transmission lines of optical LANs.

In general, the refractive index profile of GI fibers can be defined by the following Formula I:

$$n(r) = \begin{cases} n_1[1 - F(r)]^{1/2} & (0 \leq r \leq a) \\ n_1[1 - F(a)]^{1/2} & (r > a) \end{cases} \quad (I)$$

where F is a function representing the shape of the profile, "a" is a core radius, $n_1$ is the refractive index at the center of the core, and "r" is a distance between any given position within the core and the center of the core.

Conventional GI fibers are essentially made of silica glass and are doped with an amount of one or more dopants, e.g., germanium (Ge). The concentration of the one or more dopants, e.g., germanium, is varied in the cross-sectional direction.

When a single dopant is used, the shape of the profile F of the dopant can be defined by the following Formula II:

$$F(r) = 2\Delta\left(\frac{r}{a}\right)^\alpha \quad (II)$$

here $\Delta$ is the relative refractive index difference at the center of the core with respect to the cladding, and $\alpha$ is a refractive index profile exponential parameter.

Since the optimum value $\alpha_{opt}$ which provides a high transmission bandwidth is wavelength dependent, a maximum transmission bandwidth is obtained only at a certain wavelength. Conventional GI fibers which are doped with a single dopant (e.g., germanium) are optimized for a certain wavelength since an optimal shape of the profile of such fibers varies depending on wavelength.

Profiles of conventional GI multimode fibers doped with a single dopant, e.g., germanium (Ge) are controlled very precisely, and further improvement in performance seems almost impossible at present. Recently, demands for faster optical LANs have created a need for multimode fibers, e.g., GI fibers having a wider transmission bandwidth than those currently available. Thus, the use of wavelength division multiplexing (WDM) has been studied.

However, since GI multimode fibers doped with a single dopant, e.g., germanium (Ge), are optimized for a certain wavelength as mentioned above, the transmission bandwidth of such fibers becomes significantly small at wavelengths other than the optimal wavelength. Such fibers are, therefore, unsuitable for wavelength division multiplexing.

SUMMARY OF THE INVENTION

A first exemplary aspect of the present invention was made in view of the above, and an object thereof is to provide a graded-index multimode fiber which provides a maximum transmission bandwidth at various wavelengths and is free from any dependence on the wavelength of the signal light In order to solve the problems mentioned above, the first exemplary aspect of the present invention provides a graded-index multimode fiber including a core which is made of silica glass and includes a central region and an outer peripheral region, and a cladding which is provided at an outer periphery of the core. The central region of the core contains one of germanium and phosphorus, and the outer peripheral region of the core contains fluorine.

The graded-index multimode fiber according to the first exemplary aspect of the present invention is an improvement over a method described in E. A. J. Marcatili, "Modal dispersion in optical fibers with arbitrary numerical aperture and profile dispersion", The Bell System Technical Journal, Vol. 65, No. 1, pp. 44-63, 1977, and preferably has a refractive index profile which satisfies the following Formulas (1)-(4):

$$n(r) = \begin{cases} n_1[1 - F(r)]^{1/2} & (0 \leq r \leq a) \\ n_1[1 - F(a)]^{1/2} & (r > a) \end{cases} \quad (1)$$

$$F(r) = \begin{cases} 2\Delta_1\left(\frac{r}{a_0}\right)^{\alpha_1} & r < a_0 \\ 2\Delta_2\left(\frac{r}{a}\right)^{\alpha_2} & a_0 \leq r \leq a \end{cases} \quad (2)$$

-continued $$n_1^2\left[1-2\Delta_2\left(\frac{a_0}{a}\right)^{\alpha_2}\right]=n_0^2 \quad (3)$$

$$n_1^2[1-2\Delta_1]=n_0^2 \quad (4)$$

where n(r) is a refractive index of the optical fiber at a distance "r" from the center of the core, $n_1$ is a refractive index at the center of the core, $\Delta_1$ is a maximum relative refractive index difference of one of germanium and phosphorus contained in the central region of the core with respect to the cladding, $\Delta_2$ is a maximum relative refractive index difference of fluorine contained in the central region of the core the core with respect to the cladding, "a" is a core radius, $\alpha_1$ is a refractive index profile exponential parameter of the one of germanium and phosphorus contained in the central region of the core, $\Delta_2$ is a refractive index profile exponential parameter of fluorine contained in the outer peripheral region of the core, $a_0$ is a distance between the central and outer peripheral regions of the core, and $n_0$ is a refractive index of pure silica.

In the graded-index multimode fiber according to the first exemplary aspect of the present invention, each of the refractive index profile exponential parameters $\alpha_1$ and $\alpha_2$ in Formulas (2) and (3) may have an optimum value which maximizes the transmission bandwidth at an operating wavelength region.

In the graded-index multimode fiber according to the first exemplary aspect of the present invention, germanium may be contained in the central region of the core, fluorine may be contained in the outer peripheral region of the core, the diameter of the core may be 50 µm, the diameter of the cladding may be 125 µm, and the transmission bandwidth at operating wavelengths between 0.8 µm and 1.1 µm may be greater than 3 GHz·km.

In the graded-index multimode fiber according to the first exemplary aspect of the present invention, germanium may be contained in the central region of the core, fluorine may be contained in the outer peripheral region of the core, the diameter of the core may be 62.5 µm, the diameter of the cladding may be 125 µm, and the transmission bandwidth at wavelengths between 0.85 µm and 1.1 µm may be greater than 2 GHz·km.

In the graded-index multimode fiber according to the first exemplary aspect of the present invention, phosphorus may be contained in the central region of the core, fluorine may be contained in the outer peripheral region of the core, the diameter of the core may be 50 µm, the diameter of the cladding may be 125 µm, and the transmission bandwidth at wavelengths between 0.8 µm and 1.3 µm may be greater than 3 GHz·km.

In the graded-index multimode fiber according to the first exemplary aspect of the present invention, phosphorus may be contained in the central region of the core, fluorine may be contained in the outer peripheral region of the core, the diameter of the core may be 62.5 µm, the diameter of the cladding may be 125 µm, and the transmission bandwidth at wavelengths between 0.8 µm and 1.2 µm may be greater than 2 GHz·km.

In the graded-index multimode fiber according to the first exemplary aspect of the present invention, phosphorus may be contained in the central region of the core, fluorine may be contained in the outer peripheral region of the core, and a transmission loss at wavelengths between 0.8 µm and 1.3 µm may be 2 dB/km or less.

An object of a second exemplary aspect of the present invention is to provide a GI fiber which maintains a high transmission bandwidth at a relatively wide bandwidth range, and manufacturing method therefor.

To solve the problems mentioned above, the second exemplary aspect of the present invention provides a method for manufacturing a graded-index multimode fiber which includes a core and a cladding and is essentially made of silica glass. The method includes a step of doping germanium (Ge) and fluorine (F) instead of germanium and boron (B) which are discussed in R. Olshansky, "Multiple-α index profiles", Appl. Opt., Vol. 18, pp. 683-689, 1979, into the fiber so that a variation in $\alpha_i$ with a change in wavelength of the graded-index multimode fiber expressed by the following Formula becomes zero:

$$F(r)=\sum_{i=1}^{2}2\Delta_i\left(\frac{r}{a}\right)^{\alpha_i} \quad (5-1)$$

where $\Delta_i$ is a relative refractive index difference at the center of the core with respect to the cladding for each of the refractive index profiles, $\alpha_i$ is a refractive index profile exponential parameter defined by the following Formula (5-2):

$$\alpha_i=2-2\frac{n_1}{N_1}\frac{\lambda}{\Delta_i}\frac{d\Delta_i}{d\lambda}-\frac{12}{5}\Delta \quad (5-2)$$

where $n_1$ is a refractive index at a center of the core, $N_1$ is a group index at the center of the core, "a" is a core radius, λ is a wavelength, $\Delta=\Delta_1+\Delta_2$, $\Delta_i$ is a relative refractive index difference at the center of the core with respect to the cladding, and i=1 or 2 representing germanium or fluorine.

The second exemplary aspect of the present invention provides a graded-index multimode fiber manufactured by the above-mentioned manufacturing method, and has a relative refractive index difference Δ of not less than 0.005 and not more than 0.025, and a core radius "a" of not less than 10 µm and not more than 35 µm.

The second exemplary aspect of the present invention provides a graded-index multimode fiber which satisfies the above-mentioned conditions, and has a relative refractive index difference Δ of 0.019 or greater and a transmission bandwidth of greater than 1.5 GHz·km at the wavelength λ of between 0.8 µm and 1.4 µm.

Furthermore, the second exemplary aspect of the present invention provides a graded-index multimode fiber which has A of not less than 0.005 and not more than 0.025, an "a" of not less than 10 µm and not more than 35 µm, and has a relative refractive index difference A of 0.009 or greater and a transmission bandwidth of greater than 3 GHz·km at the wavelength λ of between 0.8 µm and 1.3 µm.

The second exemplary aspect of the present invention provides a graded-index multimode fiber which satisfies the above-mentioned conditions, and is used for wavelength division multiplexing.

BRIEF DESCRIPTION OF THE DRAWINGS

These and other features, aspects, and advantages of the present invention will become better understood with reference to the following description, appended claims, and accompanying drawings, which should not be read to limit the invention in any way, in which:

DETAILED DESCRIPTION OF THE INVENTION

First Exemplary Embodiment

A first exemplary embodiment of the present invention will now be described in detail.

Figure 49:
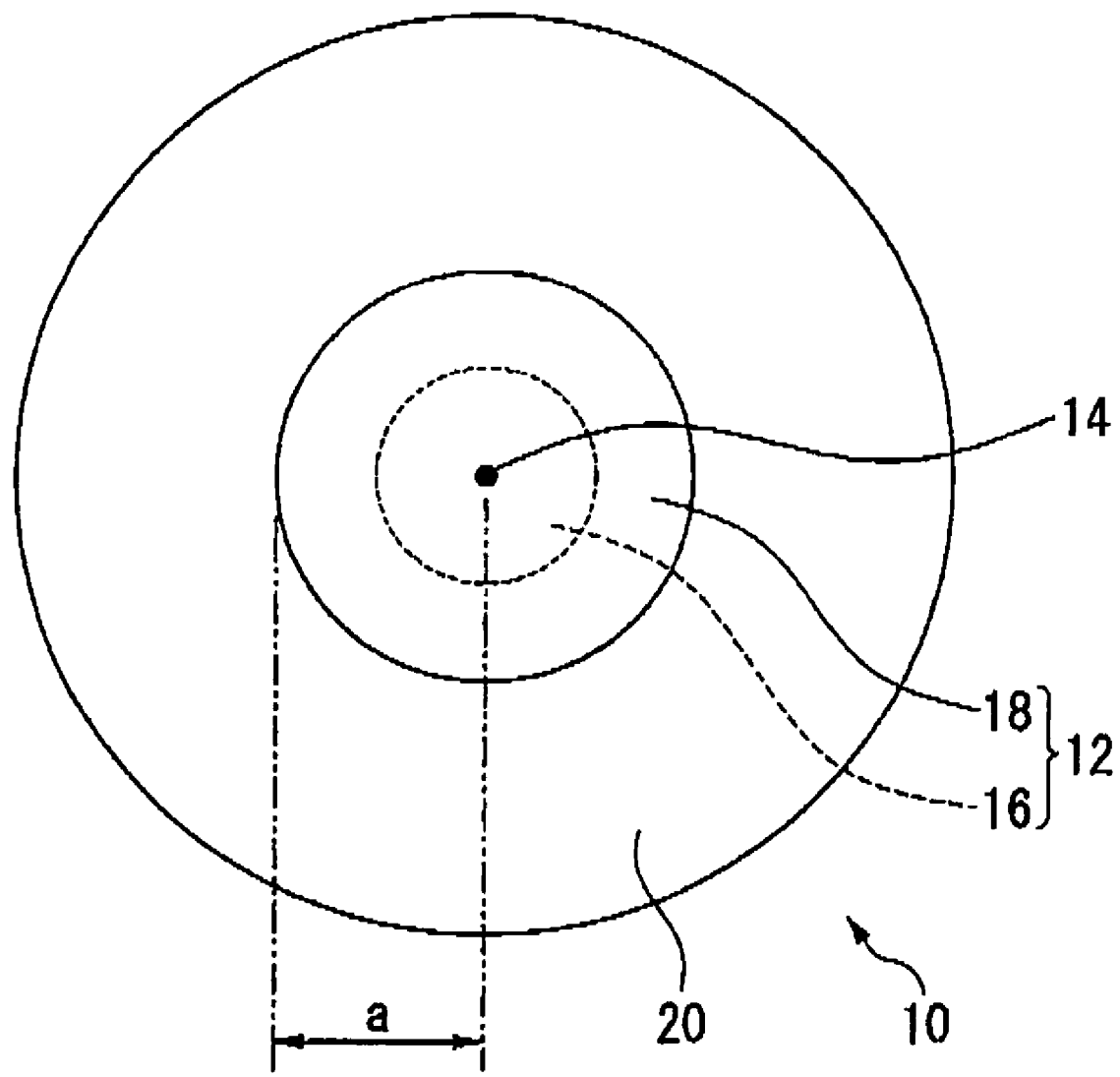
FIG. 49 is a schematic cross-sectional view showing an example of the GI multimode fiber according to a first exemplary embodiment of the present invention.

FIG. 49 is a schematic cross-sectional view showing an example of a GI multimode fiber 10 according to the first exemplary embodiment of the present invention. It is not intended, however, that this figure shows the actual dimension of the GI multimode fibers of the first exemplary embodiment of the present invention. The GI multimode fiber 10 according to the first exemplary embodiment of the present invention is an optical fiber including a core 12 made of silica glass containing either germanium (Ge) or phosphorus (P) in a central region 16 and containing fluorine (F) in an outer peripheral region 18, and a cladding 20 which is provided concentrically surrounding the core 12.

The central region 16 of the core 12 is an inner region of the core 12 which concentrically surrounds the center of the core 14. The central region 16 contains either germanium or phosphorus, and extends radially from the center of the core to about 70% of the core radius. The outer peripheral region 18 of the core 12 is the rest of the core 12 which concentrically surrounds the central region 16.

In addition, the GI multimode fiber 10 according to the first exemplary embodiment of the present invention is an optical fiber which has a refractive index profile satisfying the following Formulas (1)-(4);

$$n(r) = \begin{cases} n_1[1 - F(r)]^{1/2} & (0 \leq r \leq a) \\ n_1[1 - F(a)]^{1/2} & (r > a) \end{cases} \quad (1)$$

$$F(r) = \begin{cases} 2\Delta_1\left(\frac{r}{a_0}\right)^{\alpha_1} & r < a_0 \\ 2\Delta_2\left(\frac{r}{a}\right)^{\alpha_2} & a_0 \leq r \leq a \end{cases} \quad (2)$$

$$n_1^2\left[1 - 2\Delta_2\left(\frac{a_0}{a}\right)^{\alpha_2}\right] = n_0^2 \quad (3)$$

$$n_1^2[1 - 2\Delta_1] = n_0^2 \quad (4)$$

where n(r) is a refractive index of the optical fiber 10 at a distance "r" from the center of the core 14, $n_1$ is a refractive index at the center of the core 14, Δ is a maximum relative refractive index difference of the core 12 with respect to the cladding 20, "a" is a core radius, $\alpha_1$ is a refractive index profile exponential parameter of the one of germanium and phosphorus contained in the central region of the core, $\alpha_2$ is a refractive index profile exponential parameter of fluorine contained in the outer peripheral region of the core, $a_0$ is a distance between the central and outer peripheral regions 18 of the core 12, and $n_0$ is a refractive index of pure silica.

While the refractive index profile exponential parameters α (i.e., $\alpha_1$ and $\alpha_2$) are adjusted to values which provide a maximum transmission bandwidth at a desired wavelength, the optimum values $\alpha_{opt}$ of $\alpha_1$ and $\alpha_2$ vary depending on the dopant (e.g., germanium, phosphorus, fluorine) doped into silica glass.

The refractive index profile of a GI multimode fiber 10 of the present invention which is represented by Formulas (1)-(4) is shaped such that once the refractive index profile is highest at the center of the core 14, it gradually decreases with increasing distance from the center. Therefore, signal light propagating through the GI multimode fiber 10 in a lower order mode travels a shorter distance but at a slower rate. In contrast, signal light propagating in a higher order mode travels a longer distance but at a higher rate near the boundary between the core 12 and the cladding 20 where the refractive index is smaller.

Accordingly, by changing the value of α which determines the shape of the profile, the difference in arrival time until light signals at various modes propagating through the GI multimode fiber 10 reach the output port can be minimized. Under the properly selected a, the modal dispersion becomes the theoretical minimum, providing the maximum transmission bandwidth at the wavelength of signal light. On the other hand, the optimum value $\alpha_{opt}$ of a changes depending on the wavelength employed. Furthermore, this change is affected by the one or more dopants doped into the core 12 and the concentration of the one or more dopants.

Figure 1:
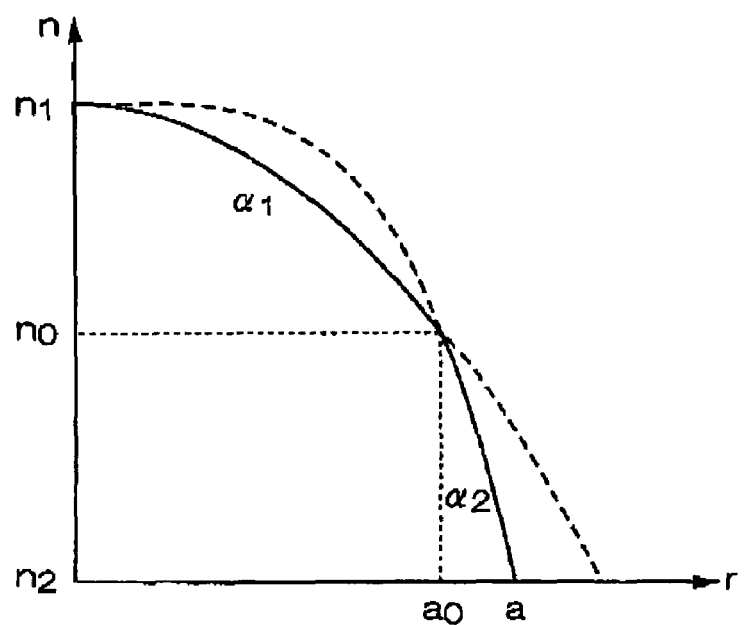
FIG. 1 is a graph illustrating a refractive index profile of a fiber which is doped with different dopants in two different regions.

According to the first exemplary embodiment of the present invention, the optimum values of refractive index profile exponential parameter $\alpha_1$ of germanium or phosphorus contained in the central region 16 of the core 12 and refractive index profile exponential parameter $\alpha_2$ of fluorine contained in the outer peripheral region 18 of the core 12 can be controlled respectively so that a transmission bandwidth at an operating wavelength region is maximized, regardless of actual values thereof. Thus, refractive index profile exponential parameters $\alpha_1$ and $\alpha_2$ respectively determine refractive index profiles of the central and outer peripheral regions 18 of the core 12, respectively, as shown in FIG. 1, regardless of actual values thereof.

The maximum relative refractive index difference $\Delta_{in}$ of the central region 16 (r<$a_0$) of the core 12 with respect to the cladding 20 due to the dopant contained in the central region 16 of the core 12 (i.e., germanium or phosphorus) is expressed by the following Formula (6), and the maximum relative refractive index difference $\Delta_{out}$ of the outer peripheral region 18 of the core 12 (r>$a_0$) with respect to the cladding 20 due to the dopant contained in the outer peripheral region 18 of the core 12 (i.e., fluorine) is expressed by the following Formula (7):

$$\Delta_{in} = \frac{n_1^2 - n_0^2}{2n_1^2} \quad (6)$$

$$\Delta_{out} = \frac{n_0^2 - n_2^2}{2n_0^2} \quad (7)$$

where $n_1$ and $n_2$ have a relationship defined by the following Formula (8):

$$n_2^2 = n_1^2[1-\Delta_2] \quad (8)$$

Accordingly, the maximum relative refractive index difference Δ of the entire core 12 with respect to the cladding 20 can be defined by following Formula (9):

$$\Delta = \Delta_{in} + \Delta_{out} - 2\Delta_{in}\Delta_{out} \quad (9)$$

Under a refractive index profile which satisfies all of Formulas (1)-(4) and (6)-(9), a maximum transmission bandwidth is obtained when both of the refractive index profile exponential parameters $\alpha_1$ and $\alpha_2$ are optimized respectively. The optimum value of $\alpha_1$ is a value of a which provides a maximum transmission bandwidth when it is assumed that only the dopant contained in the central region of the core contributes to the α-order index profile, i.e., refractive index profile defined by Formulas (1)-(4). The optimum value of $\alpha_2$ is a value of a which provides a maximum transmission bandwidth when it is assumed that only the dopant contained in the outer peripheral region of the core contributes to the α-order index profile.

Figure 2:
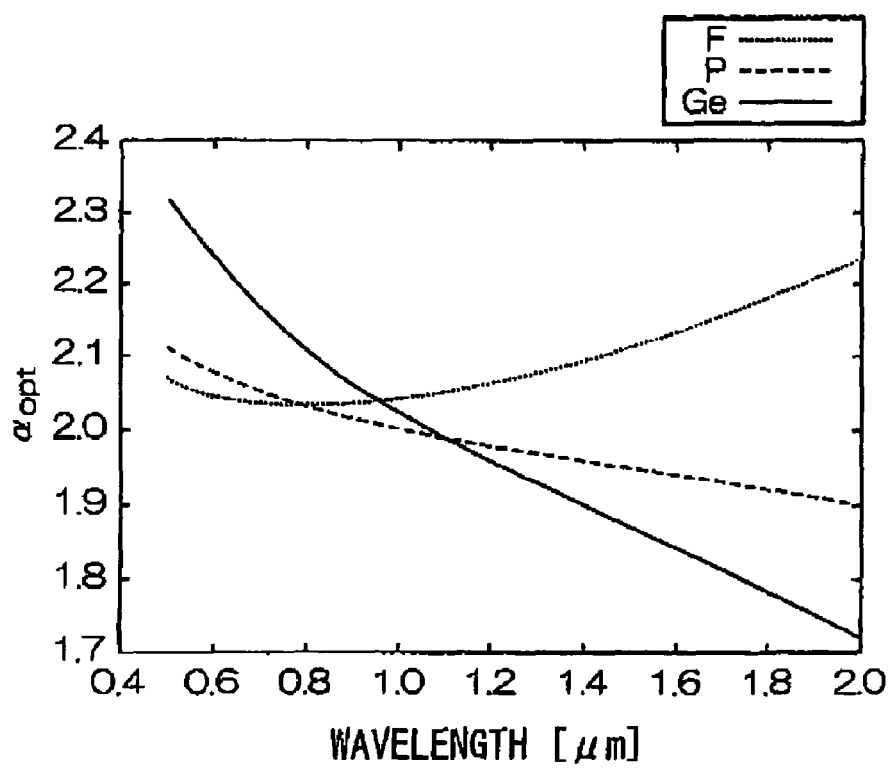
FIG. 2 is a graph illustrating the wavelength dependence of the optimum values $\alpha_{opt}$ of the refractive index profile exponential parameters $\alpha$ in Formulas (1)-(4) defining refractive index profiles of three GI multimode fibers each having a core doped with germanium or phosphorus or fluorine, respectively.

FIG. 2 is a graph illustrating the wavelength dependence of the optimum values $\alpha_{opt}$ of the refractive index profile exponential parameters α of GI multimode fibers having a maximum relative refractive index difference of the core with respect to the cladding Δ of 0.01 in Formulas (1)-(4) defining refractive index profiles of three GI multimode fibers each having a core 12 doped with germanium, phosphorus or fluorine, respectively.

While germanium and phosphorus increase the refractive index, fluorine reduces the same. Furthermore, FIG. 2 indicates that the optimum value $\alpha_{opt}$ deviates the most with change in wavelength in the GI multimode fiber 10 including a core 12 containing germanium, exhibiting the largest wavelength dependence of transmission bandwidth.

FIG. 2 also shows that the change in the optimum value $\alpha_{opt}$ with wavelength is smaller in the GI multimode fibers having a core 12 containing phosphorus or fluorine than the ones having a core 12 containing germanium. Therefore, the wavelength dependence of transmission bandwidth is smaller in these GI multimode fibers.

Furthermore, a wavelength range which exhibits a large transmission bandwidth can be further expended by doping germanium and fluorine, or phosphorus and fluorine into the GI multimode fiber 10 according to the first exemplary embodiment of the present invention.

Fabrication of fibers by co-doping multiple dopants into the core 12 in production, however, is difficult. In addition, when fabricating GI multimode fibers with the MCVD (modified plasma chemical vapor deposition) method, a large maximum relative refractive index difference Δ cannot be obtained by doping only fluorine.

Accordingly, by doping either germanium or phosphorus into a central region 16 of a core 12 of a graded-index multimode fiber 10, and fluorine into an outer peripheral region 18 of the core 12, a larger maximum relative refractive index difference Δ can be obtained in the first exemplary embodiment of the present invention than GI multimode fibers obtained by doping only a single dopant.

As shown in FIG. 2, an optimum value $\alpha_{opt}$ of germanium or phosphorus generally monotonically decreases with increase in wavelength while an optimum value $\alpha_{opt}$ of fluorine generally monotonically increases with increase in wavelength. Therefore, a GI multimode fiber which exhibits a wide transmission bandwidth in a wide wavelength range can be obtained by doping these dopants in an appropriate ratio.

A GI multimode fiber 10 which is doped with germanium into a central region 16 of the core 12 and is doped with fluorine into an outer peripheral region 18 of the core 12 will be described as an example.

It is assumed that both a refractive index profile exponential parameter $\alpha_1$ of germanium contained in the central region 16 of the core 12 and a refractive index profile exponential parameter $\alpha_2$ of fluorine contained in an outer peripheral region 18 of the core 12 are optimized for a wavelength of 0.85 μm this GI multimode fiber 10. The GI multimode fiber 10 has a maximum transmission bandwidth at a wavelength of 0.85 μm since the fiber 10 is optimized for this wavelength.

At wavelengths longer than 0.85 μm, higher-order modes tend to propagate slower than lower-order modes since the refractive index profile exponential parameter $\alpha_1$ becomes larger than the optimum value thereof. In contrast, higher-order modes would also tend to propagate faster than lower-order modes since the refractive index profile exponential parameter $\alpha_2$ becomes larger than the optimum value thereof. Thus, the wide transmission bandwidth is maintained at wavelengths longer than 0.85 μm since the two effects offset each other.

In the graded-index multimode fiber 10 according to the first exemplary embodiment of the present invention, if germanium is contained in the central region 16 of a core 12, fluorine is contained in the outer peripheral region 18 of the core 12, the diameter of the core 12 is 50 μm, and the diameter of the cladding 20 is 125 μm, the transmission bandwidth at wavelengths between 0.8 μm and 11 μm becomes greater than 3 GHz·km. A transmission bandwidth is defined as a product of a possible transmission rate and a length of an optical fiber, representing the transmission capacity of the optical fiber.

Therefore, the GI multimode fiber 10 according to the first exemplary embodiment of the present invention has a high transmission rate at wavelengths between 0.8 μm and 1.1 μm. Thus the fiber 10 is suitable for wavelength division multiplexing transmission.

If germanium is contained in the central region 16 of a core 12, fluorine is contained in the outer peripheral region 18 of the core 12, the diameter of the core 12 is 62.5 μm, and the diameter of the cladding 20 is 125 μm in the graded-index multimode fiber 10 according to the first exemplary embodiment of the present invention, the transmission bandwidth at wavelengths between 0.85 μm and 1.1 μm becomes greater than 2 GHz·km.

Therefore, the GI multimode fiber 10 according to the first exemplary embodiment of the present invention has a high transmission rate at wavelengths between 0.85 μm and 1.1 μm. Thus the fiber 10 is suitable for wavelength division multiplexing transmission.

If phosphorus is contained in the central region 16 of a core 12, fluorine is contained in the outer peripheral region 18 of the core 12, the diameter of the core 12 is 50 μm, and the diameter of the cladding 20 is 125 μm in the graded-index multimode fiber 10 according to the first exemplary embodiment of the present invention, the transmission bandwidth at wavelengths between 0.8 μm and 1.3 μm becomes greater than 3 GHz·km.

Therefore, the GI multimode fiber 10 according to the first exemplary embodiment of the present invention has a high transmission rate at wavelengths between 0.8 μm and 13 μm. Thus the fiber 10 is suitable for wavelength division multiplexing transmission.

If phosphorus is contained in the central region 16 of a core 12, fluorine is contained in the outer peripheral region 18 of the core 12, the diameter of the core 12 is 62.5 μm, and the diameter of the cladding 20 is 125 μm in the graded-index multimode fiber 10 according to the first exemplary embodiment of the present invention, the transmission bandwidth at wavelengths between 0.8 μm and 1.2 μm becomes greater than 2 GHz·km.

Therefore, the GI multimode fiber 10 according to the first exemplary embodiment of the present invention has a high transmission rate at wavelengths between 0.8 μm and 1.2 μm. Thus the fiber 10 is suitable for wavelength division multiplexing If phosphorus is contained in the central region 16 of the core 12, and fluorine is contained in the outer peripheral region 18 of the core 12 in the GI multimode fiber 10 according to the first exemplary embodiment of the present invention, a transmission loss at wavelengths between 0.8 μm and 1.3 μm becomes 2 dB/km or less.

Therefore, the GI multimode fiber 10 according to the first exemplary embodiment of the present invention has a high transmission rate at wavelengths between 0.8 μm and 1.3 μm. Thus the fiber 10 is suitable for wavelength division multiplexing transmission.

Fabrication of a GI multimode fiber 10 of the first exemplary embodiment of the present invention will now be described.

A preform of the GI multimode fiber 10 of the first exemplary embodiment of the present invention is fabricated using a PCVD (plasma chemical vapor deposition) or MCVD (modified plasma chemical vapor deposition) method by doping the two dopants into the outer peripheral region 18 of the core 12 and then into the central region 16 of the core 12, and precisely controlling the amount of the dopants so that a desired refractive index profile is obtained. A GI multimode fiber 10 is formed by drawing the obtained preform under high temperature conditions.

The first exemplary embodiment of the present invention will now be described in greater detail using examples. It is not intended, however, that the present invention be limited to the examples described.

EXAMPLE 1

GI multimode fibers 10 are fabricated including a core 12 made of silica glass containing germanium in a central region 16 and containing fluorine in an outer peripheral region 18, and a cladding 20 made of silica glass concentrically surrounding the core 12.

The GI multimode fibers 10 are optimized at a wavelength of 0.85 μm, and the relative refractive index difference Δ of the fiber with respect to the cladding 20 at the center of the core 14 is adjusted to 0.01. Furthermore, the diameter of the core 12 is adjusted to 50 μm (core radius "a" of 25 μm), and the diameter of the cladding 20 is adjusted to 125 μm.

Figure 3:
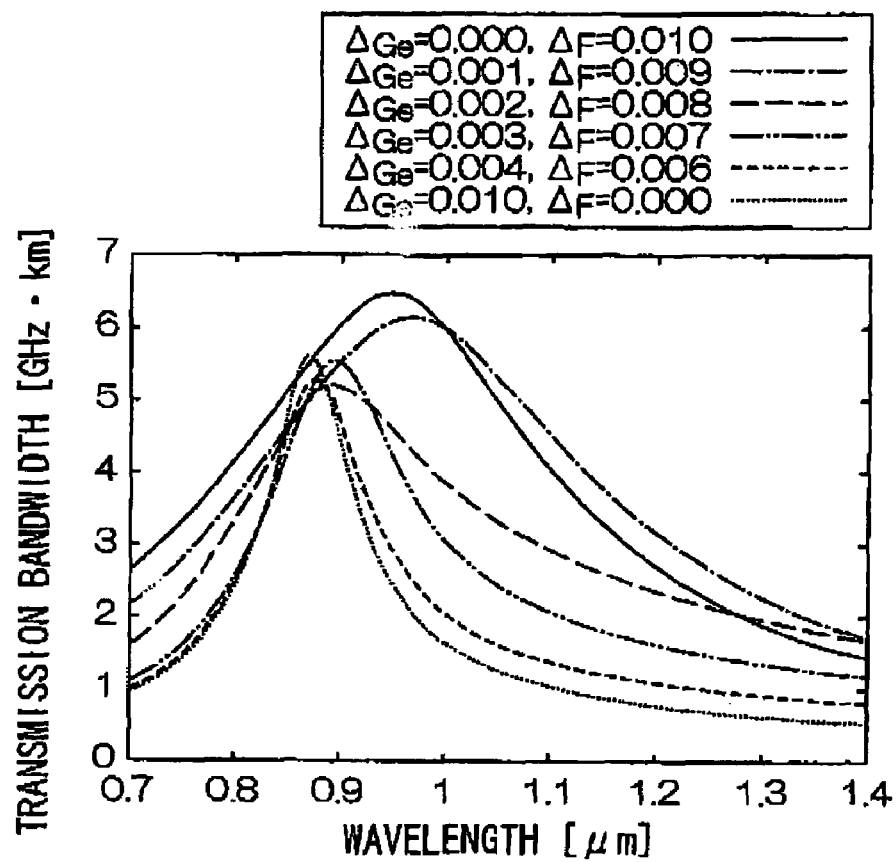
FIG. 3 is a graph illustrating the wavelength dependence of transmission bandwidth of GI multimode fibers.
Figure 4:
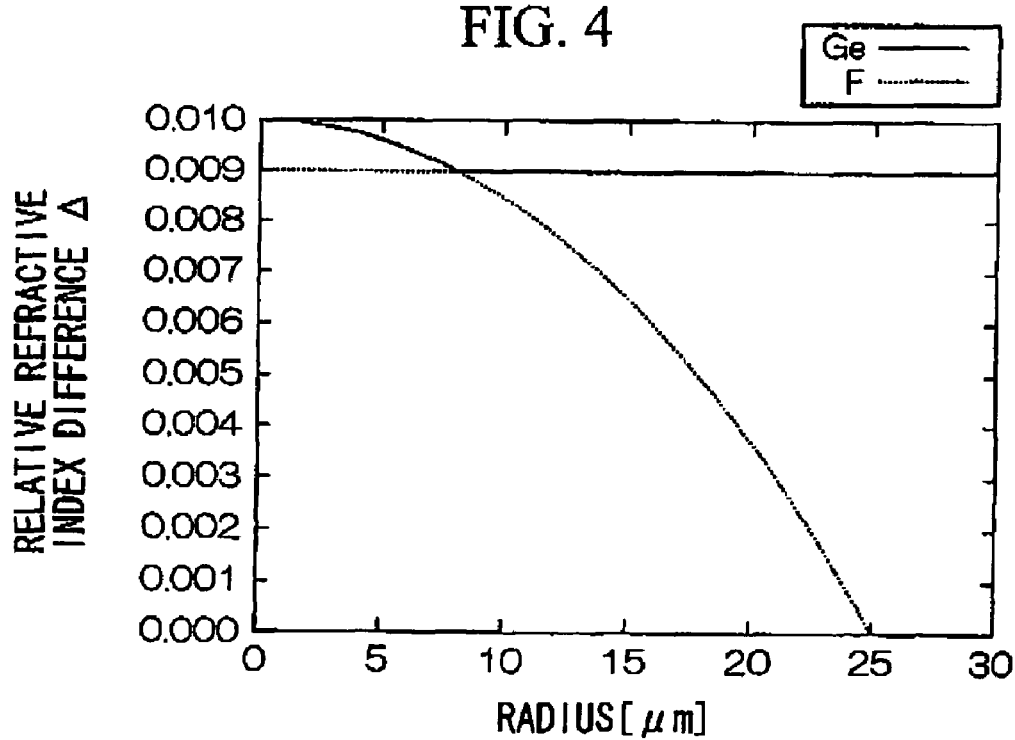
FIG. 4 is a graph illustrating profiles of relative refractive index difference $\Delta$ at the core when the ratio of $\Delta_{Ge}=\Delta_{in}$ to $\Delta_F=\Delta_{out}$ is varied.
Figure 5:
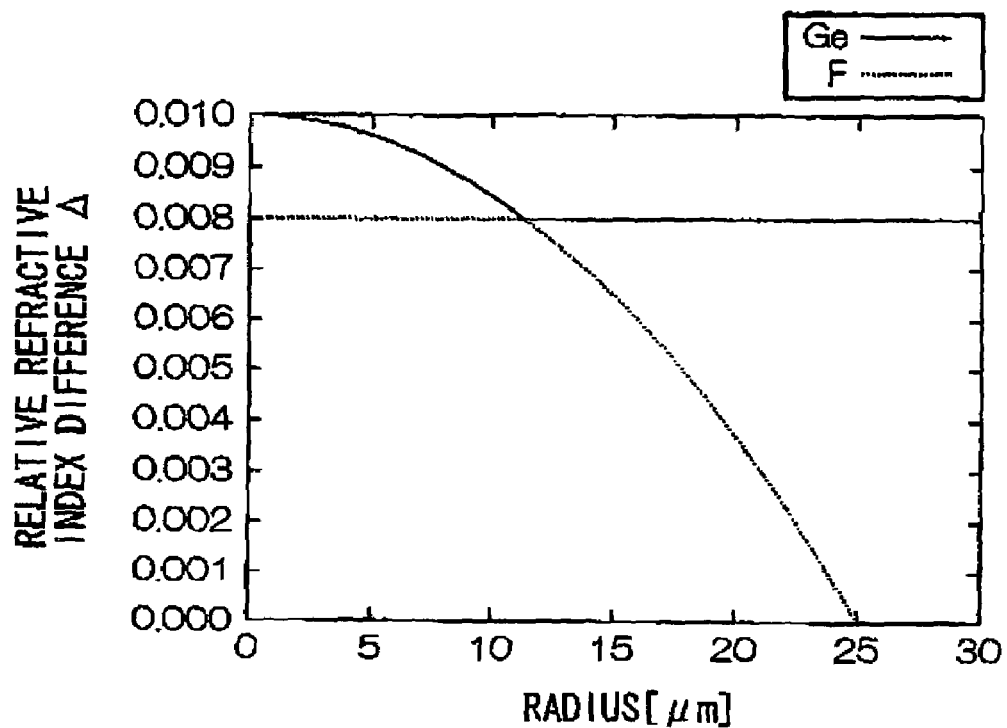
FIG. 5 is a graph illustrating profiles of relative refractive index difference $\Delta$ at the core when the ratio of $\Delta_{Ge}=\Delta_{in}$ to $\Delta_F=\Delta_{out}$ is varied.
Figure 6:
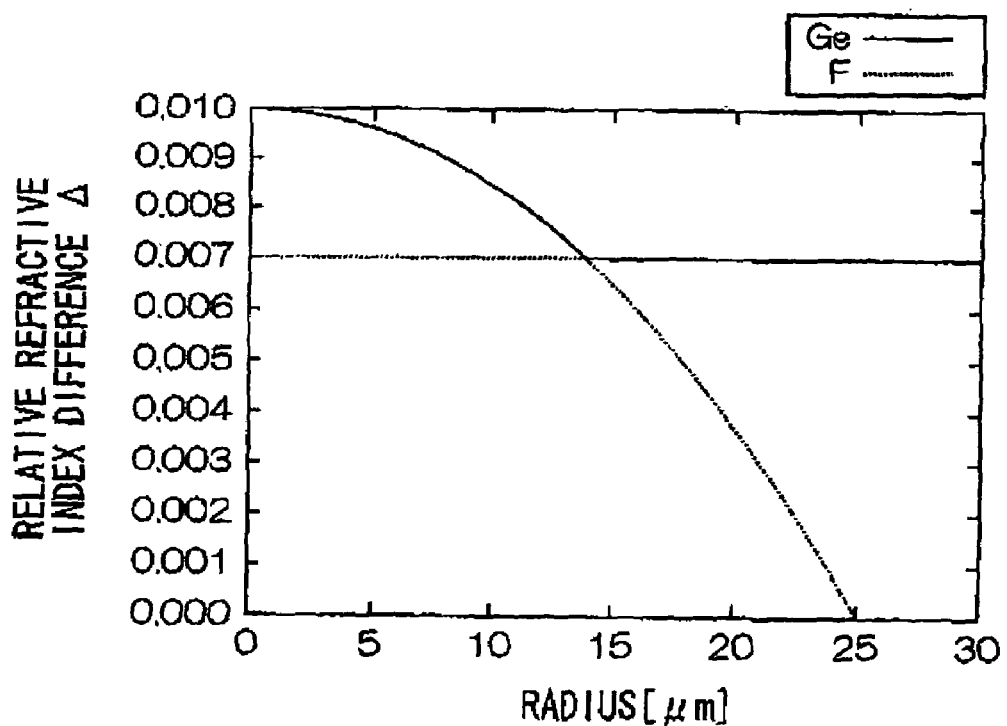
FIG. 6 is a graph illustrating profiles of relative refractive index difference $\Delta$ at the core when the ratio of $\Delta_{Ge}=\Delta_{in}$ to $\Delta_F=\Delta_{out}$ is varied.
Figure 7:
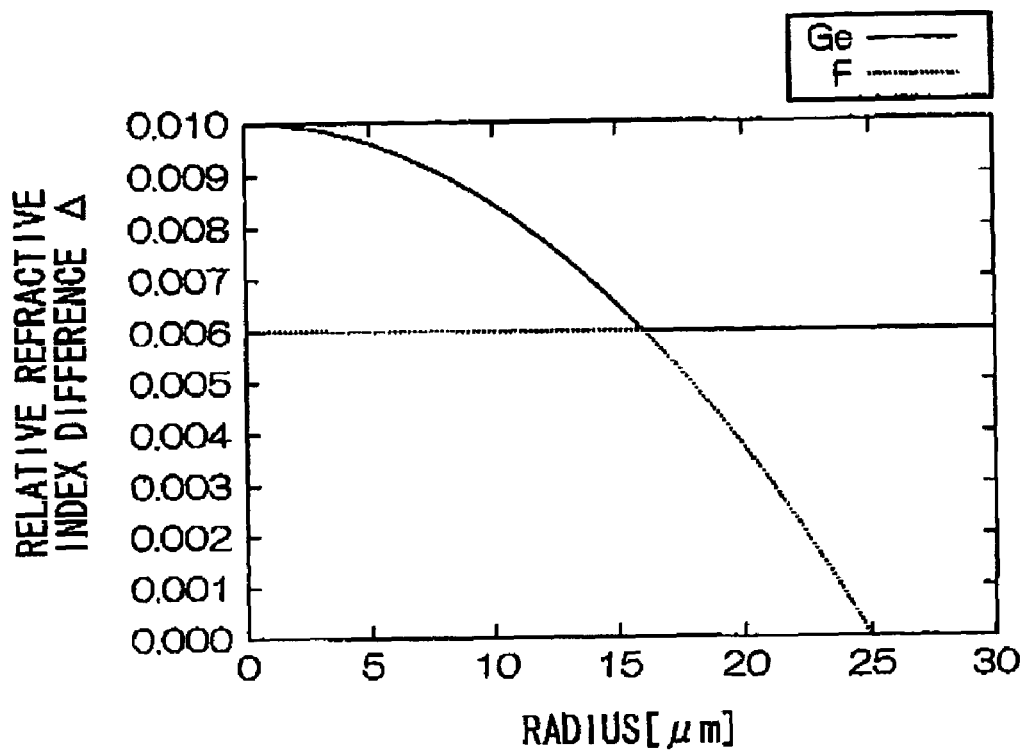
FIG. 7 is a graph illustrating profiles of relative refractive index difference $\Delta$ at the core when the ratio of $\Delta_{Ge}=\Delta_{in}$ to $\Delta_F=\Delta_{out}$ is varied.
Figure 8:
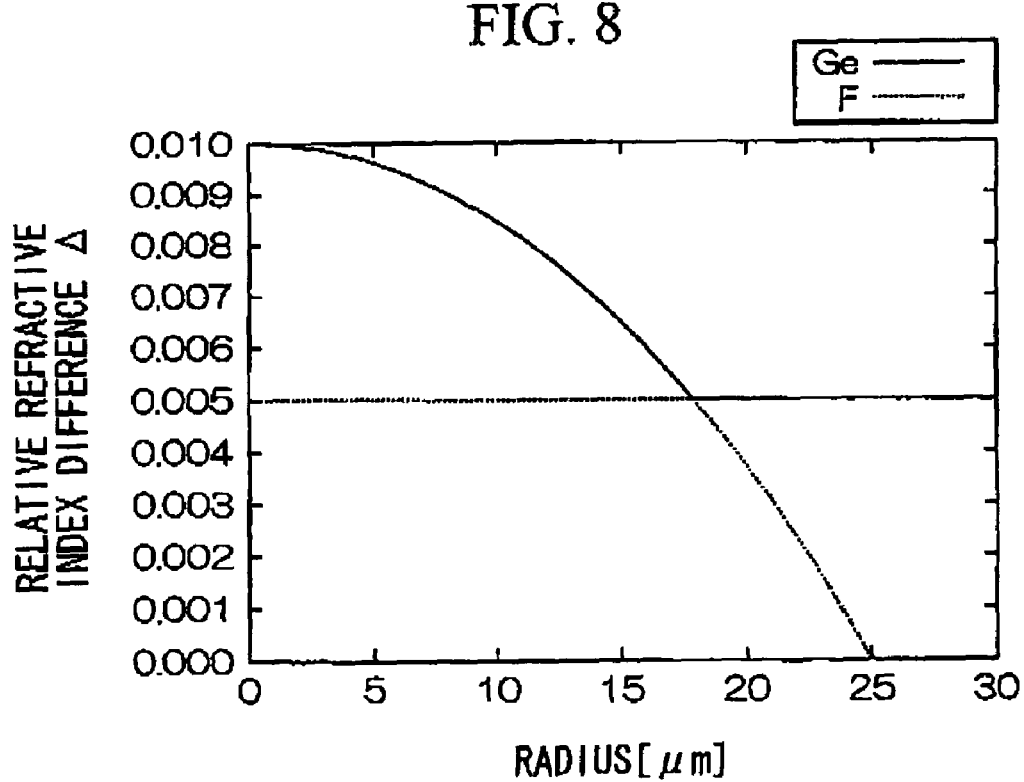
FIG. 8 is a graph illustrating profiles of relative refractive index difference $\Delta$ at the core when the ratio of are $\Delta_{Ge}=\Delta_{in}$ to $\Delta_F=\Delta_{out}$ is varied.

Δ is set to be $\Delta_{Ge}+\Delta_F$ while varying the ratio of $\Delta_{Ge}=\Delta_{in}$ to $\Delta_F=\Delta_{out}$ The wavelength dependence of transmission bandwidth of the resultant GI multimode fibers 10 is examined, and the results are shown in FIG. 3.

The results shown in FIG. 3 show that the GI multimode fibers 10 including a core 12 containing germanium in the central region 16 and containing fluorine in the outer peripheral region 18 have a large transmission bandwidth in a wider wavelength range than the GI multimode fibers including a core 12 containing only germanium Furthermore, an optical fiber having a wide transmission bandwidth can be obtained by increasing the amount of fluorine since the optimum value $\alpha_{opt}$ of the refractive index profile exponential parameter α of fluorine exhibits less dependence on wavelength.

FIGS. 4-8 show relative refractive index difference profiles of the cores 12 when the ratio of $\Delta_{Ge}=\Delta_{in}$ to $\Delta_F=\Delta_{out}$ is varied. FIGS. 4-8 show relative refractive index difference profiles with $\Delta_{Ge}/\Delta_F$ of 0.001/0.009, 0.002/0.008, 0.003/0.007, 0.004/0.006, and 0.005/0.005, respectively.

EXAMPLE 2

GI multimode fibers 10 are fabricated including a core 12 made of silica glass containing germanium in a central region 16 and containing fluorine in an outer peripheral region 18, and a cladding 20 made of silica glass concentrically surrounding the core 12.

The GI multimode fibers 10 are optimized at a wavelength of 0.85 μm, and the relative refractive index difference Δ of the fiber 10 with respect to the cladding 20 at the center of the core 14 is adjusted to 0.02. The core diameter is set to 62.5 μm (a core radius "a" of 31.25 μm), and the diameter of the cladding 20 was set to 125 μm.

Figure 9:
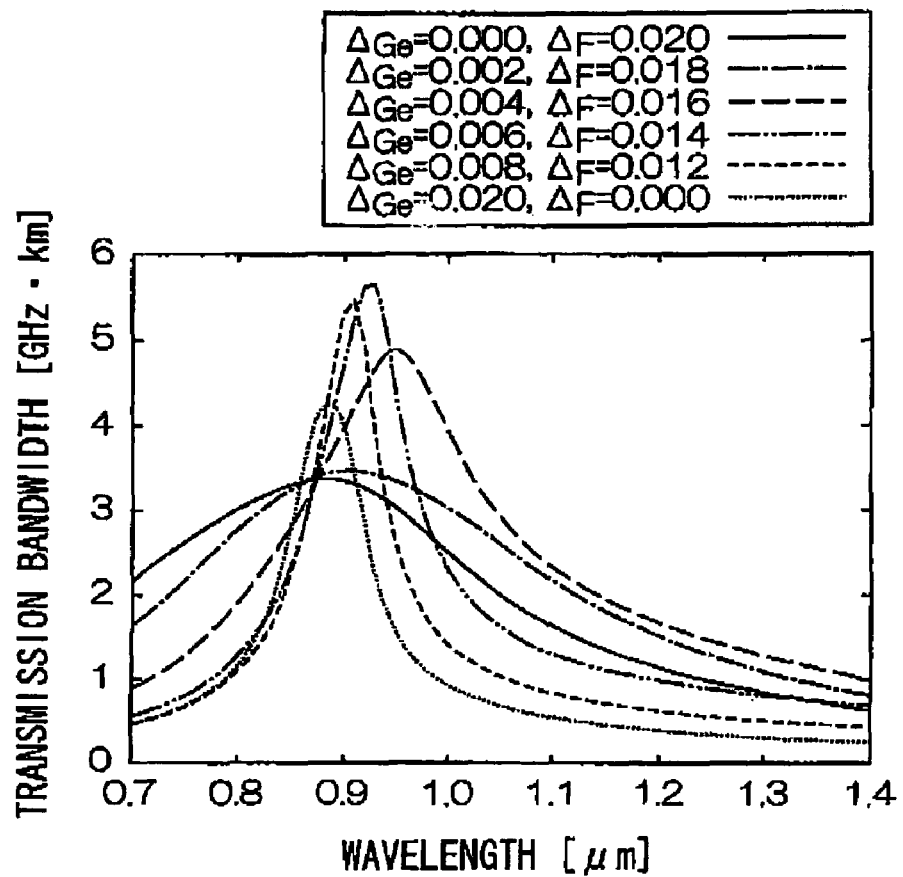
FIG. 9 is a graph illustrating the wavelength dependence of transmission bandwidth of GI multimode fibers.
Figure 10:
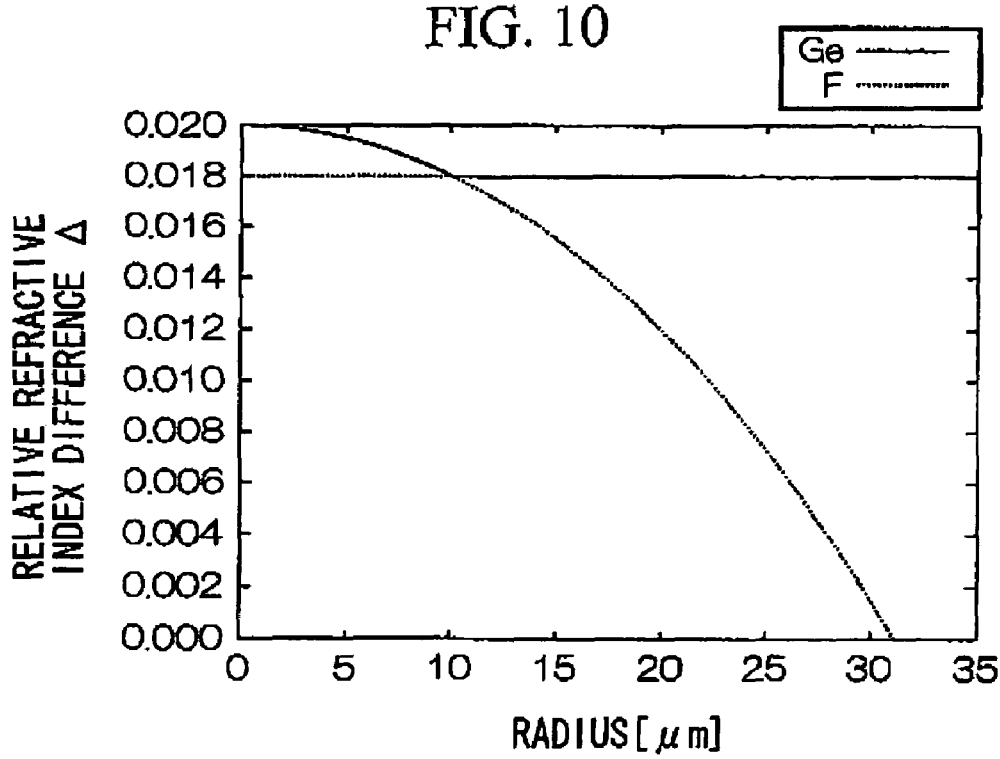
FIG. 10 is a graph illustrating profiles of relative refractive index difference $\Delta$ at the core when varying the ratio of $\Delta_{Ge}=\Delta_{in}$ to $\Delta_F=\Delta_{out}$.
Figure 11:
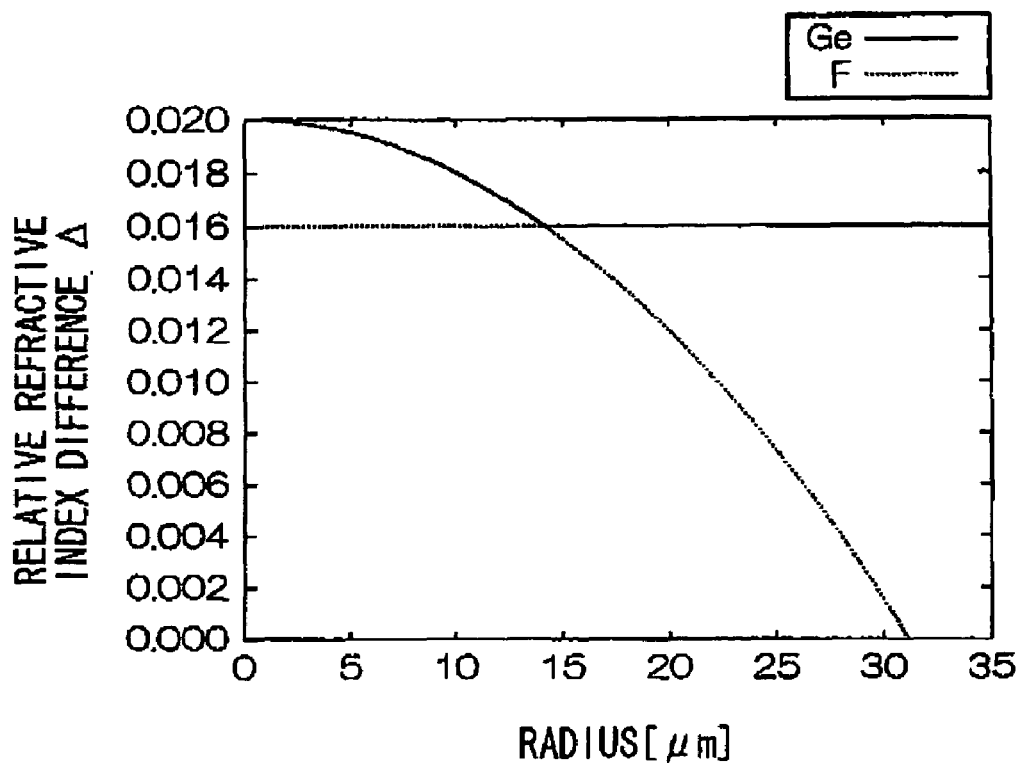
FIG. 11 is a graph illustrating profiles of relative refractive index difference $\Delta$ at the core when varying the ratio of $\Delta_{Ge}=\Delta_{in}$ to $\Delta_F=\Delta_{out}$.
Figure 12:
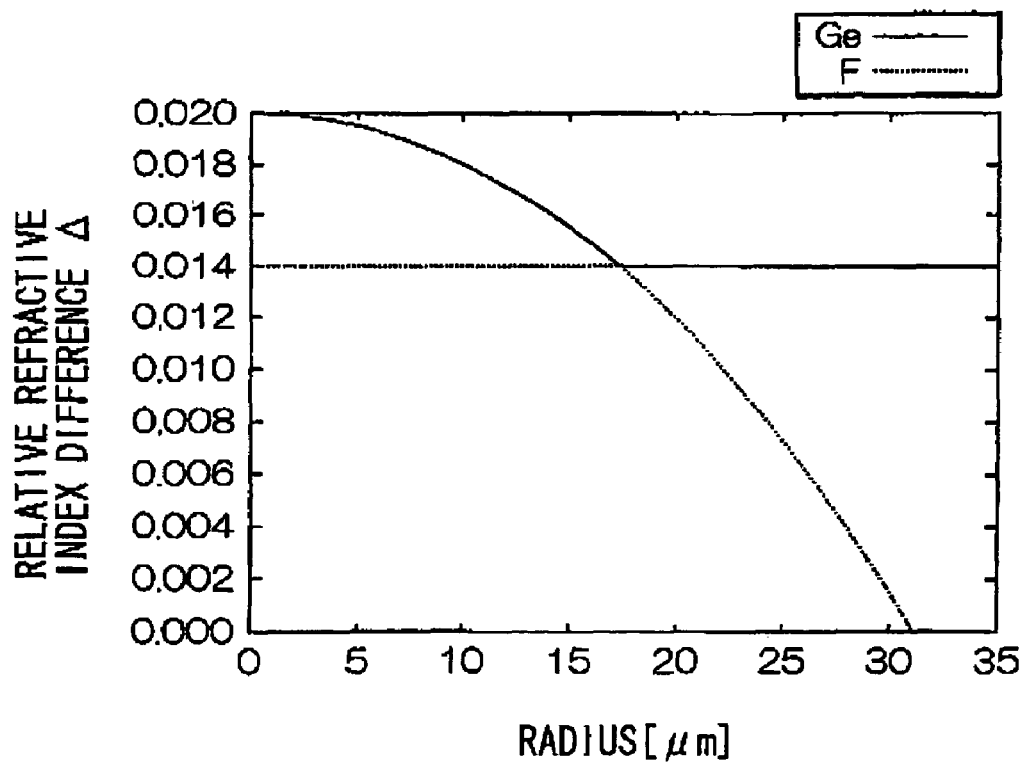
FIG. 12 is a graph illustrating profiles of relative refractive index difference $\Delta$ at the core when varying the ratio of $\Delta_{Ge}=\Delta_{in}$ to $\Delta_F=\Delta_{out}$.
Figure 13:
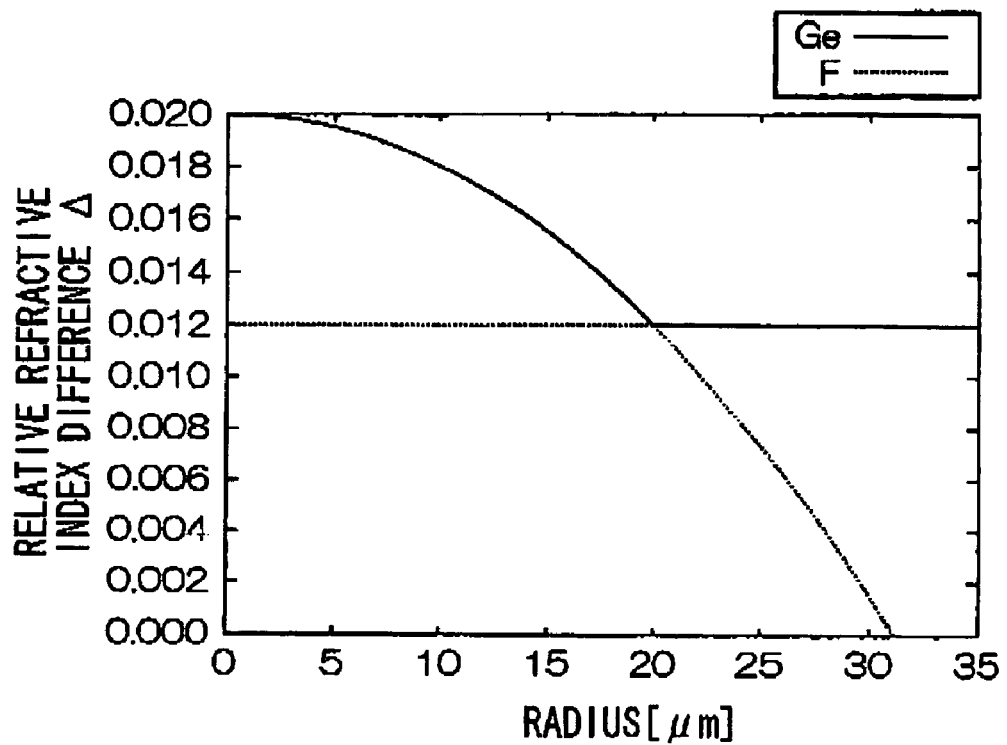
FIG. 13 is a graph illustrating profiles of relative refractive index difference $\Delta$ at the core when varying the ratio of $\Delta_{Ge}=\Delta_{in}$ to $\Delta_F=\Delta_{out}$.
Figure 14:
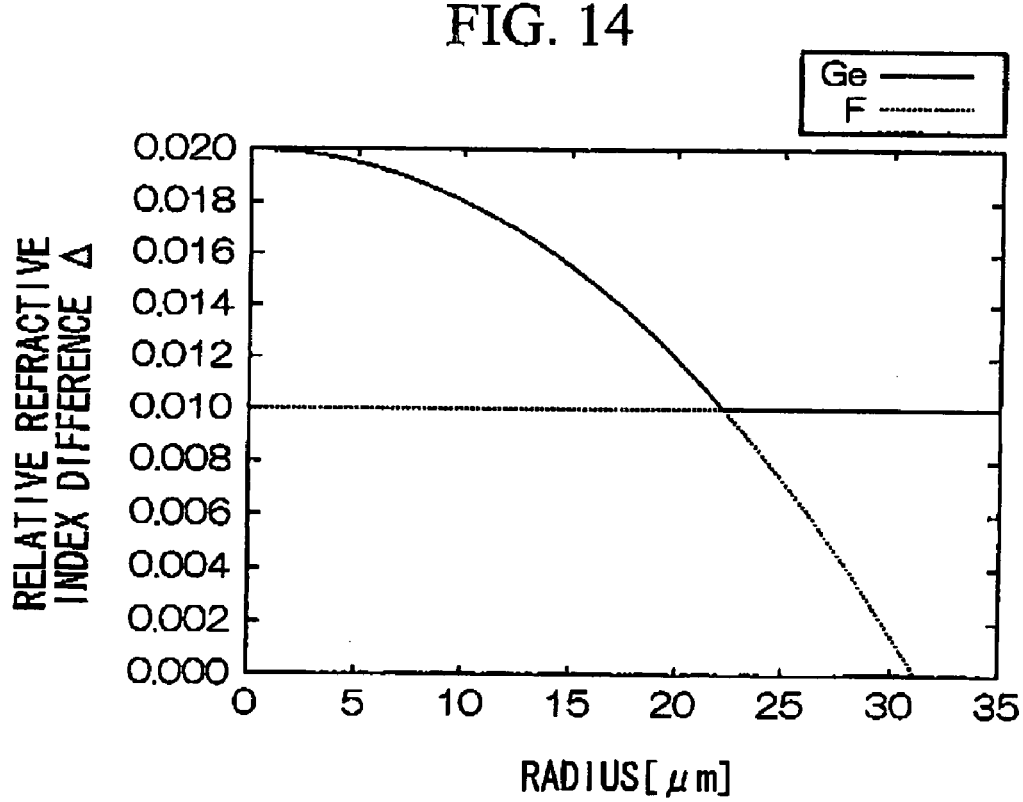
FIG. 14 is a graph illustrating profiles of relative refractive index difference $\Delta$ at the core when varying the ratio of $\Delta_{Ge}=\Delta_{in}$ to $\Delta_F=\Delta_{out}$.

Δ is set to be $\Delta_{Ge}+\Delta_F$ while varying the ratio of $\Delta_{Ge}=\Delta_{in}$ to $\Delta_F=\Delta_{out}$ The wavelength dependence of transmission bandwidth of the resultant GI multimode fibers 10 is examined, and the results are shown in FIG. 9.

The results shown in FIG. 9 show that the GI multimode fibers 10 including a core 12 containing germanium in the central region 16 and containing fluorine in the outer peripheral region 18 have a large transmission bandwidth in a wider wavelength range than the GI multimode fibers including a core 12 containing only germanium. Furthermore, the fiber having $\Delta_{Ge}$ of 0.004 and $\Delta_F$ of 0.016 exhibits the best performance.

FIGS. 10-14 show relative refractive index difference profiles of the cores 12 when the ratio of $\Delta_{Ge}=\Delta_{in}$ to $\Delta_F=\Delta_{out}$ is varied. FIGS. 10-14 show relative refractive index difference profiles with $\Delta_{Ge}/\Delta_F$ of 0.002/0.018, 0.004/0.016, 0.006/0.014, 0.008/0.012, and 0.010/0.010, respectively.

EXAMPLE 3

GI multimode fibers 10 are fabricated including a core 12 made of silica glass containing phosphorus in a central region 16 and containing fluorine in an outer peripheral region 18, and a cladding 20 made of silica glass concentrically surrounding the core 12.

The GI multimode fibers 10 are optimized at a wavelength of 0.85 μm, and the relative refractive index difference Δ of the fiber with respect to the cladding 20 at the center of the core 14 is adjusted to 0.01. Furthermore, the diameter of the core 12 is adjusted to 50 μm (core radius "a" of 25 μm), and the diameter of the cladding 20 is adjusted to 125 μm.

Δ is set to be $\Delta_P+\Delta_F$ while varying the ratio of $\Delta_P=\Delta_{in}$ to $\Delta_F=\Delta_{out}$.

Figure 15:
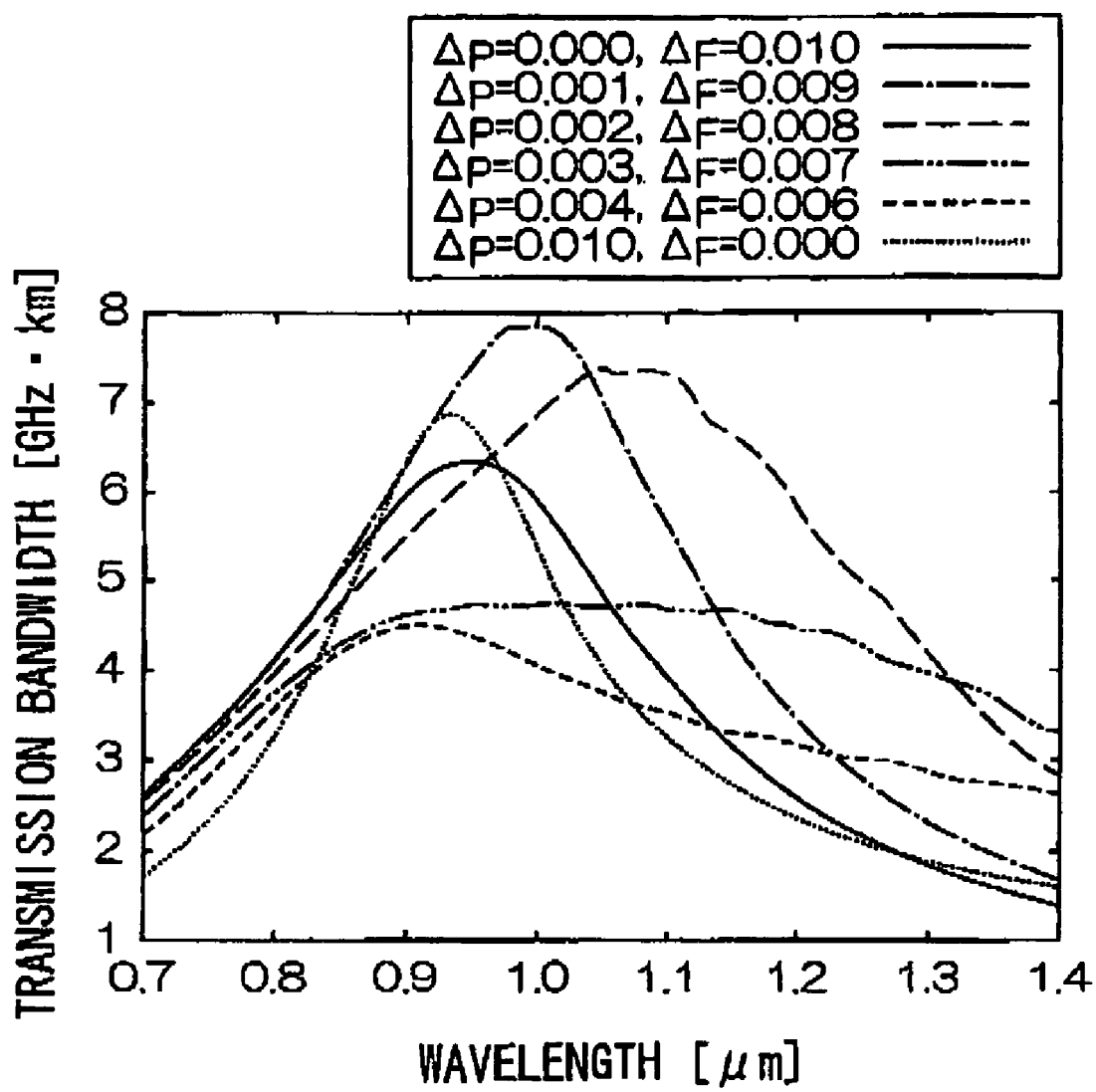
FIG. 15 is a graph illustrating the wavelength dependence of transmission bandwidth of GI multimode fibers.

The wavelength dependence of transmission bandwidth of the resultant GI multimode fibers 10 is examined, and the results are shown in FIG. 15.

The results shown in FIG. 15 show that the GI multimode fibers including a core 12 doped with phosphorus and fluorine have a large transmission bandwidth in a wider wavelength range than the GI multimode fibers including a core 12 doped with either phosphorus. Furthermore, the fiber having $\Delta_P$ of 0.002 and $\Delta_F$ of 0.008 exhibits the best performance.

Furthermore, doping small amounts of phosphorus into a core 12 reduces the Rayleigh scattering index, which is especially effective at short wavelengths. In addition, the central region 16 of the core 12 has a low melting viscosity since it is made from silica glass containing phosphorus. Therefore, fiber preforms can be readily manufactured by the PCVD or MCVD methods since porous preforms can collapse easily.

EXAMPLE 4

GI multimode fibers 10 are fabricated including a core 12 made of silica glass containing phosphorus in a central region 16 and containing fluorine in an outer peripheral region 18, and a cladding 20 made of silica glass concentrically surrounding the core 12.

The GI multimode fibers 10 are optimized at a wavelength of 0.85 μm, and the relative refractive index difference Δ of the fiber 10 with respect to the cladding 20 at the center of the core 14 is adjusted to 0.02. The core diameter is set to 62.5 μm (a core radius "a" of 31.25 μm), and the diameter of the cladding 20 is set to 125 μm.

Δ is set to be $\Delta_P+\Delta_F$ while varying the ratio of $\Delta_P=\Delta_{in}$ to $\Delta_F=\Delta_{out}$.

Figure 16:
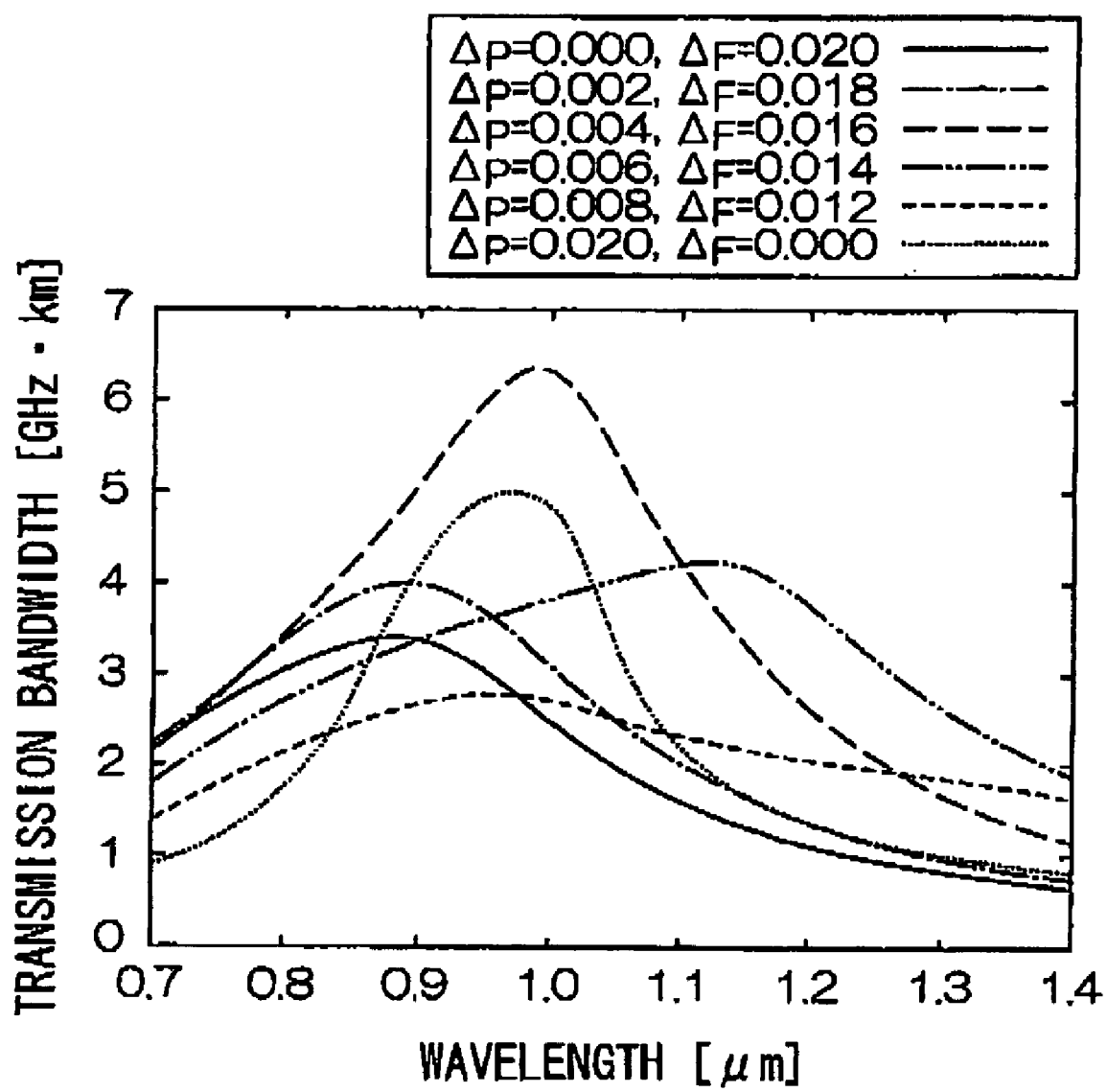
FIG. 16 is a graph illustrating the wavelength dependence of transmission bandwidth of GI multimode fibers.

The wavelength dependence of transmission bandwidth of the resultant GI multimode fibers 10 is examined, and the results are shown in FIG. 16.

The results shown in FIG. 16 show that the GI multimode fibers including a core 12 containing phosphorus in the central region 16 and containing fluorine in the outer peripheral region 18 have a large transmission bandwidth in a wider wavelength range than the GI multimode fibers including a core 12 containing only phosphorus.

Since the graded-index multimode fiber according to the flirt exemplary embodiment of the present invention contains either germanium or phosphorus in the central region 16 of the core 12, and contains fluorine in the outer peripheral region 18 of the core 12, the GI multimode fiber is an optical fiber which has a large transmission bandwidth in a wide wavelength range. Thus the fiber 10 is suitable for wavelength division multiplexing transmission.

Furthermore, since the graded-index multimode fiber according to the first exemplary embodiment of the present invention contains different dopants in two different regions of the core 12, concentration profile of the dopants and refractive index profile of the core 12 can be easily controlled. Fabricating such fibers, therefore, is easier than that of fibers containing two kinds of dopants in the same region of a core 12.

GI multimode fibers according to the first exemplary embodiment of the present invention can be employed at wavelengths of 0.85 μm or less.

Second Exemplary Embodiment

Figure 50:
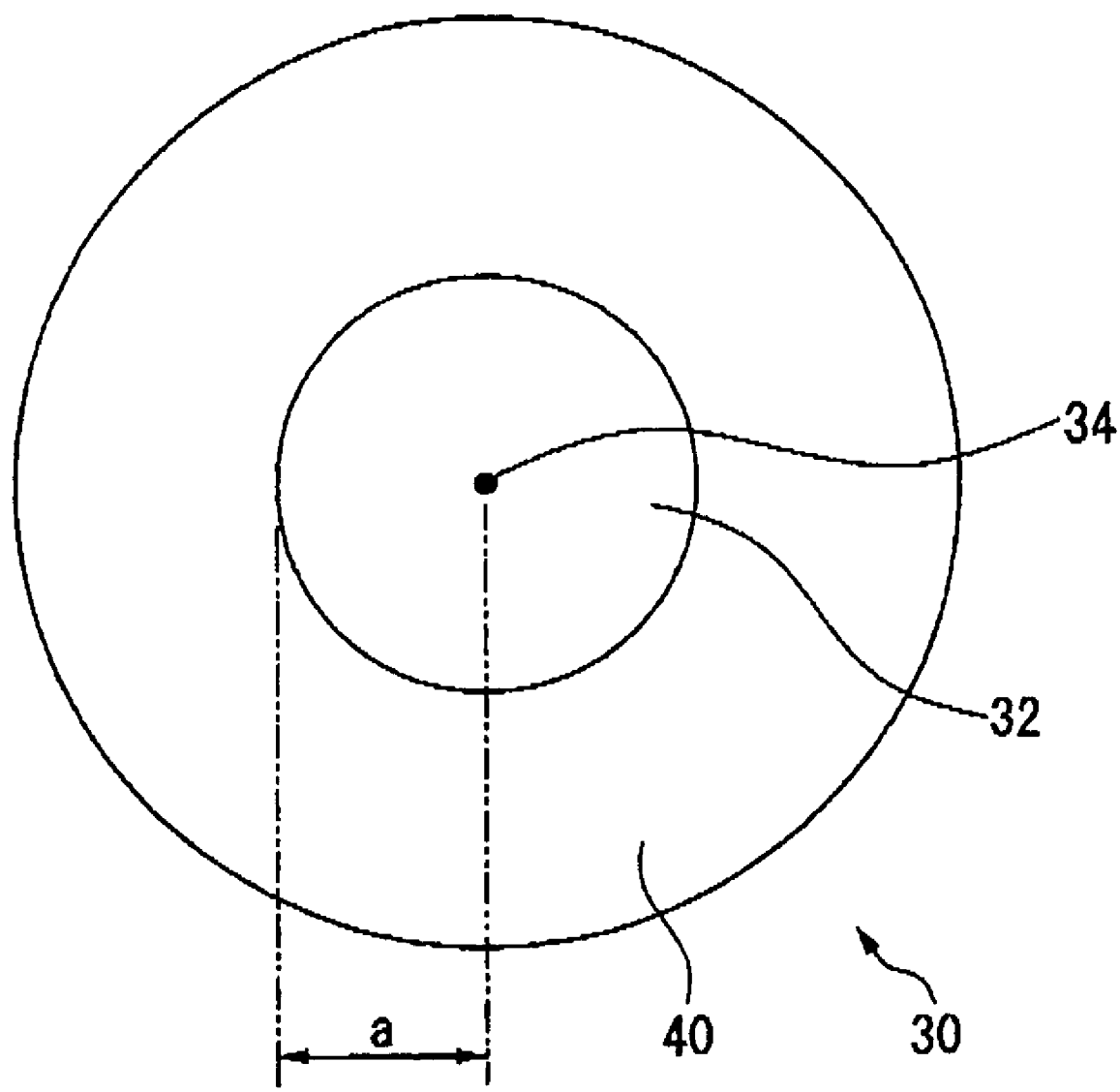
FIG. 50 is a schematic cross-sectional view showing an example of the GI multimode fiber according to a second exemplary embodiment of the present invention.

FIG. 50 is a schematic cross-sectional view showing an example of a GI multimode fiber 30 which is fabricated according to a second exemplary embodiment of the present invention. It is not intended, however, that this figure shows the actual dimension of the GI multimode fibers of the second exemplary embodiment of the present invention. The second exemplary embodiment of the present invention provides a method for manufacturing a graded-index multimode fiber 30 which includes a core 32 and a cladding 40 and is essentially made of silica glass. The graded-index multimode fiber 30 is doped with germanium and fluorine.

The graded-index multimode fiber having a refractive index profile expressed by the following Formula (1), and the method includes the step of forming the graded-index multimode fiber, wherein germanium and fluorine are doped so that a variation in as with a change in wavelength becomes zero:

$$n(r) = \begin{cases} n_1[1-F(r)]^{1/2} & (0 \leq r \leq a) \\ n_1[1-F(a)]^{1/2} & (r > a) \end{cases} \quad (1)$$

F is a fiber shape function defined by the following Formula (5-1), $$F(r) = \sum_{i=1}^{2} 2\Delta_i \left(\frac{r}{a}\right)^{\alpha_i} \quad (5\text{-}1)$$

$\alpha_i$ is a refractive index profile exponential parameter for each of the profiles defined by the following Formula (5-2):

$$\alpha_i = 2 - 2\frac{n_1}{N_1}\frac{\lambda}{\Delta_i}\frac{d\Delta_i}{d\lambda} - \frac{12}{5}\Delta \quad (5\text{-}2)$$

where $\Delta=\Delta_1+\Delta_2$, $n_1$ is a refractive index at a center of the core, $N_1$ is a group index at the center of the core, "a" is a core radius, λ is a wavelength, $\Delta_i$ is a relative refractive index difference at the center of the core with respect to the cladding for each of the refractive index profiles, and i=1 or 2 representing germanium or fluorine.

According to a second exemplary embodiment of the present invention, a GI fiber 30 having a wide transmission bandwidth in a wide wavelength range can be obtained by using a plurality of dopants and optimizing the profile of the dopants.

For example, when two dopants are used, the refractive index profile shape function of a GI fiber containing two dopants can be defined by the following Formula (10):

$$F(r) = \sum_{i=1}^{2} 2\Delta_i \left(\frac{r}{a}\right)^{\alpha_1} \tag{10}$$

As can be seen from Formula (10), a refractive index profile of a GI fiber containing a plurality of dopants is a multiples index profile. In addition, the relative refractive index difference at the center of the core with respect to the cladding Δ is defined by the following Formula (11):

$$\Delta = \Delta_1 + \Delta_2 \tag{1}$$

Furthermore, for obtaining an optimum profile of the refractive index profile defined by Formula (11), each of the profile indices must satisfy the following Formula (12):

$$\alpha_i = 2 - 2\frac{n_1}{N_1}\frac{\lambda}{\Delta_i}\frac{d\Delta_i}{d\lambda} - \frac{12}{5}\Delta \quad (i=1,2) \tag{12}$$

where $n_1$ is the refractive index at the center of the core, and $N_1$ is the group index of the center of the core which is defined by the following Formula (13):

$$N_1 = n_1 - \lambda \frac{dn_1}{d\lambda} \tag{13}$$

In manufacturing methods of conventional GI fibers containing a single dopant, $\alpha_{opt}$ at a certain wavelength $\lambda_0$ is uniquely determined. In contrast, when plural dopants are used, concentration profiles of each dopant which forms a profile index of $\alpha_i$ are determined with some degree of freedom.

Furthermore, by adding a condition defined by the following Formula (14), a transmission bandwidth performance with variation in $\alpha_{iopt}$ of substantially zero at $\lambda=\lambda_0$ can be obtained:

$$\left.\frac{d\alpha_i}{d\lambda}\right|_{\lambda=\lambda_0} = 0 \quad (i=1,2) \tag{14}$$

A GI multimode fiber 30 containing germanium and fluorine as dopants will be described. Both germanium and fluorine have been used separately as a dopant, and they are known as dopants which provide an excellent transmission loss performance. Using germanium and fluorine as exemplary dopants, $\Delta_1$ and $\Delta_2$ in Formula (12) will be explained in detail.

It is assumed that a fiber 30 is fabricated so that $\Delta_1$ and $\Delta_2$ satisfy relationships defined by the following Formula (15):

$$2n_1^2\Delta_1 = \delta_G(1-X_G) + \delta_F X_F,$$
$$2n_1^2\Delta_2 = \delta_G X_G + \delta_F(1-X_F) \tag{15}$$

where $X_G$ and $X_F$ are doping parameters of germanium and fluorine, respectively, and $\delta_G$ and $\delta_F$ are defined by the following Formula (16):

$$\delta_G = n_1^2 - n_S^2,$$
$$\delta_F = n_S^2 - n_2^2 \tag{16}$$

In Formula (16), $n_S$ is the refractive index of pure silica, $n_1$ is the refractive index at the center of the core 34, and $n_2$ is the refractive index at radius "r"=a.

To obtain conditions where variance in $\alpha_{iopt}$ becomes substantially zero at $\lambda=\lambda_0$, both sides of Formulas (10) and (15) are substituted into Formula (14) to obtain the solution defined by the following Formula (17):

$$X_G = \frac{A_{FG} + A_{FF} + S}{S},$$
$$X_F = \frac{A_{FG} + A_{GG} + S}{S} \tag{17}$$

where S and each of the indices are defined by the following Formulas (19) and (20):

$$S = \sqrt{A_{FG}^2 - A_{FF}A_{GG}} \tag{18}$$

$$A_{ij} = \delta_i'\delta_j' - \frac{\delta_i\delta_j'' + \delta_j\delta_i''}{2} + \upsilon\left(2\delta_i\delta_j - \frac{\delta_i\delta_j' + \delta_j\delta_i'}{2}\right), \tag{19}$$

$i, j = G, F$, in random order

In Formula (19), the prime mark (') indicates a differential operation of $$\lambda\left(\frac{d}{d\lambda}\right)$$

and υ is defined by the following Formula (20):

$$\upsilon = \frac{z^2 - w}{z - 2},$$
$$z = \frac{\lambda}{n_1^2}\frac{dn_1^2}{d\lambda},$$
$$w = \frac{\lambda}{n_1^2}\frac{d}{d\lambda}\left(\lambda\frac{dn_1^2}{d\lambda}\right) \tag{20}$$

The refractive index profile of a GI fiber 30 doped with germanium and fluorine can be defined by the following Formula (21):

$$n^2(r) = n_G^2(r) + n_F^2(r) - n_S^2 \tag{21}$$

where $n_G^2(r)$ and $n_F^2(r)$ are refractive index profiles due to germanium and fluorine, respectively, which are defined by the following Formula (22):

$$n_G^2 = n_1^2 - \delta_G\left[(1-X_G)\left(\frac{r}{a}\right)^{\alpha_1} + X_G\left(\frac{r}{a}\right)^{\alpha_2}\right], \quad (22)$$

$$n_F^2 = n_S^2 - \delta_F\left[X_F\left(\frac{r}{a}\right)^{\alpha_1} + (1-X_F)\left(\frac{r}{a}\right)^{\alpha_2}\right]$$

A GI fiber 30 which satisfies the above-mentioned conditions has variance in $\alpha_{iopt}$ of substantially zero at $\lambda = \lambda_0$. Thus, a wide transmission bandwidth region is maintained in a region around the center wavelength.

Preferably, the relative refractive index difference $\Delta$ is not less than 0.005 and not more than 0.025, and the core radius "a" is not less than 10 μm and not more than 35 μm. If $\Delta$ is less than 0.005, the NA (numerical aperture) of the fiber becomes smaller. If $\Delta$ is more than 0.025, too many modes am generated and the transmission bandwidth is reduced. If "a" is less than 10 μm, it becomes difficult to couple fibers or couple a fiber and a light source. If "a" is greater than 35 μm, too many modes are generated and the transmission bandwidth is reduced. Furthermore, $\lambda_0$ is preferably 0.95 μm or shorter in the second exemplary embodiment of the present invention. $\lambda_0$ of longer than 0.95 μm increases $\alpha_2$, causing a sharp increase in dopant concentration.

Besides germanium and fluorine, phosphorus and fluorine may be used as dopants. Similar to germanium, phosphorus is a dopant which provides an excellent transmission loss performance.

EXAMPLE 5

GI fibers 30 doped with both germanium and fluorine having the following parameters are designed: $\Delta_{Ge}$ and $\Delta_F$ of 0.005, a core radius "a" of 25 μm, and the center wavelengths $\lambda_0$ of between 0.75 μm and 0.95 μm.

$\Delta_{Ge}$ and $\Delta_F$ are defined by the following formula (23):

$$\Delta_{Ge} = \frac{n_1^2 - n_S^2}{2n_1^2}, \quad (23)$$

$$\Delta_F = \frac{n_S^2 - n_2^2}{2n_S^2}$$

First, $\Delta_{Ge} = \Delta_F = 0.005$ are assigned into the following Formula (24) to obtain $\delta_{Ge}$ and $\delta_F$.

$$\delta_G = n_1^2 - n_S^2,$$

$$\delta_F = n_S^2 - n_2^2 \quad (24)$$

Then, $\delta_{Ge}$ and $\delta_F$ are assigned into Formula (25) to obtain $A_{FG}$, $A_{FF}$ and $A_{GG}$, and S.

$$A_{ij} = \delta_i'\delta_j' - \frac{\delta_i\delta_j'' + \delta_j\delta_i''}{2} + v\left(2\delta_i\delta_j - \frac{\delta_i\delta_j' + \delta_j\delta_i'}{2}\right), \quad (25)$$

$i, j = G, F$, in random order $$S = \sqrt{A_{FG}^2 - A_{FF}A_{GG}} \quad (26)$$

where $$v = \frac{z^2 - w}{z - 2}, \quad (27)$$

$$z = \frac{\lambda}{n_1^2}\frac{dn_1^2}{d\lambda},$$

$$w = \frac{\lambda}{n_1^2}\frac{d}{d\lambda}\left(\lambda\frac{dn_1^2}{d\lambda}\right)$$

Next, values of $A_{FG}$, $A_{FF}$, $A_{GG}$, and S are substituted into the following Formula (28) to obtain $X_G$, and $X_F$.

$$X_G = \frac{A_{FG} + A_{FF} + S}{2}, \quad (28)$$

$$X_F = \frac{A_{FG} + A_{GG} + S}{2}$$

Next values of $X_G$ and $X_F$ are substituted into the following Formula (29) to obtain $\Delta_1$ and $\Delta_2$.

$$2n_1^2\Delta_1 = \delta_G(1-X_G) + \delta_F X_F,$$

$$2n_1^2\Delta_2 = \delta_G X_G + \delta_F(1-X_F) \quad (29)$$

From $\Delta_1$, $\Delta_2$, and Formula (30), $\alpha_1$ and $\alpha_2$ are obtained.

$$\alpha_i = 2 - 2\frac{n_1}{N_1}\frac{\lambda}{\Delta_i}\frac{d\Delta_i}{d\lambda} - \frac{12}{5}\Delta \quad (30)$$

$$\Delta = \Delta_1 + \Delta_2$$

Figure 17:
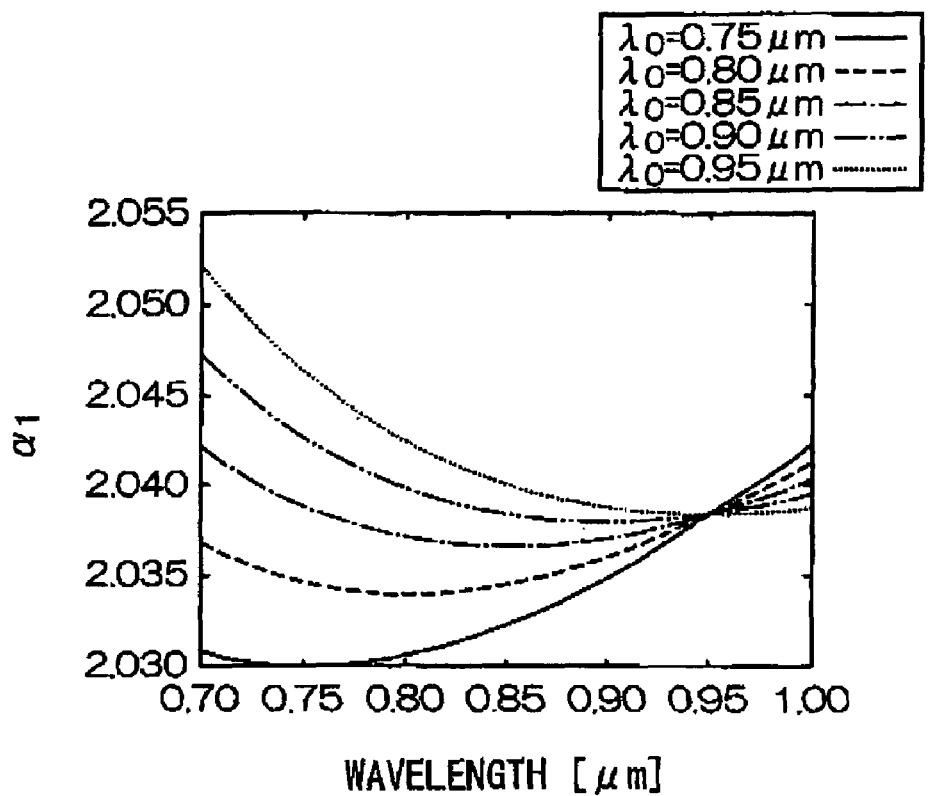
FIG. 17 is a graph of $\alpha_1$ versus wavelength when $\Delta_{Ge}=\Delta_F=0.005$, a=25 μm, and $\lambda_0$ is between 0.75 μm and 0.95 μm.
Figure 18:
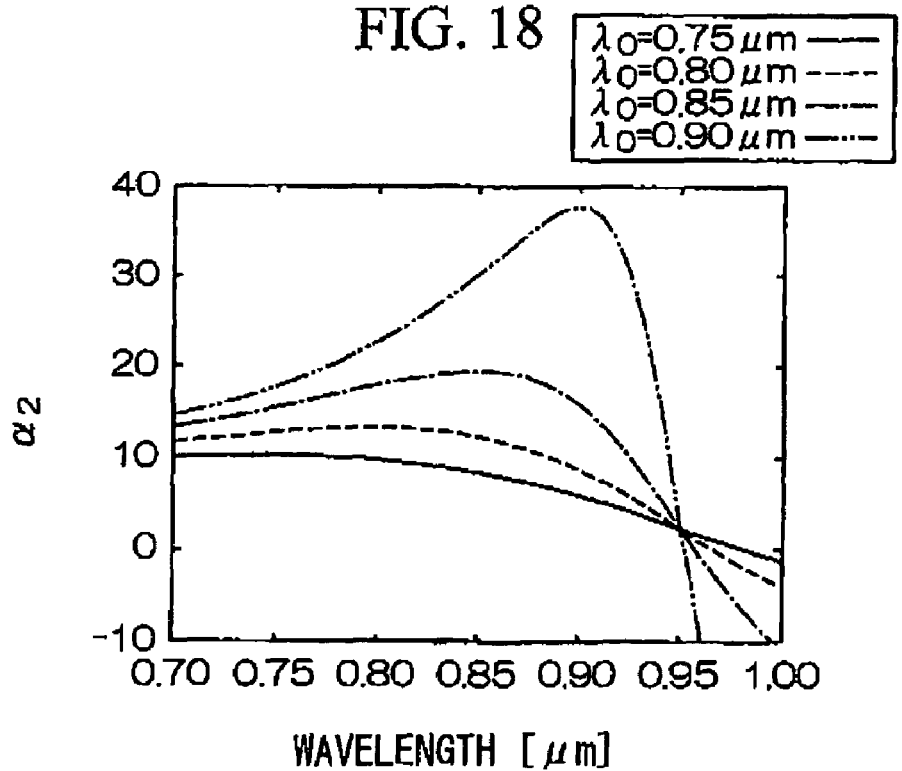
FIG. 18 is a graph of $\alpha_2$ versus wavelength when $\Delta_{Ge}=\Delta_F=0.005$, a=25 μm and $\lambda_0$ is between 0.75 μm and 0.95 μm.
Figure 19:
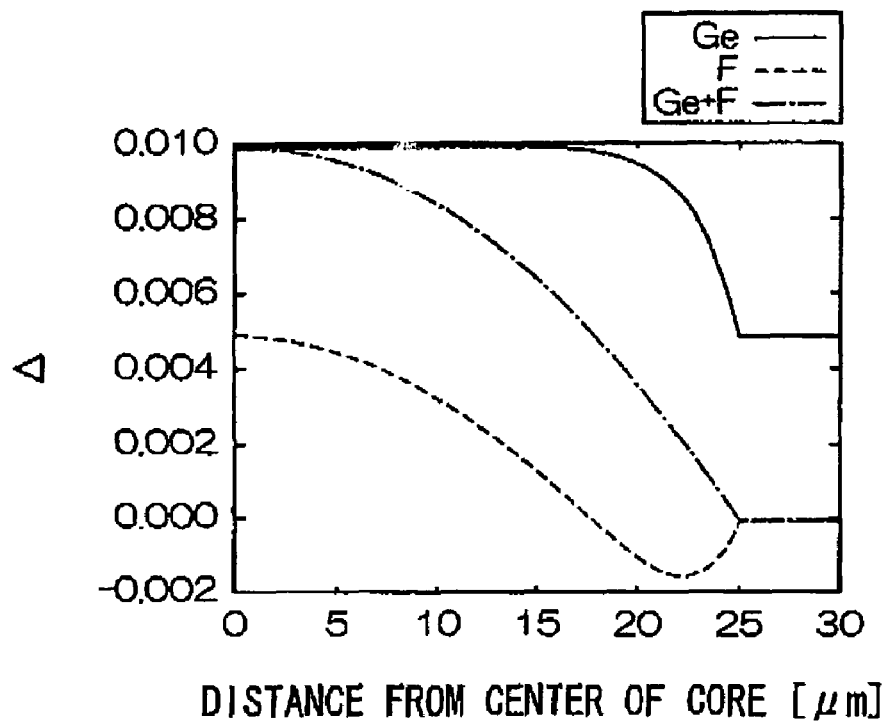
FIG. 19 is a graph illustrating relative refractive index differences $\Delta$ of a GI fiber with germanium and fluorine of the present invention optimized for $\lambda_0=0.75$ μm ($\Delta_{Ge}=\Delta_F=0.005$), and GI fibers doped only with either fluorine or with germanium.
Figure 20:
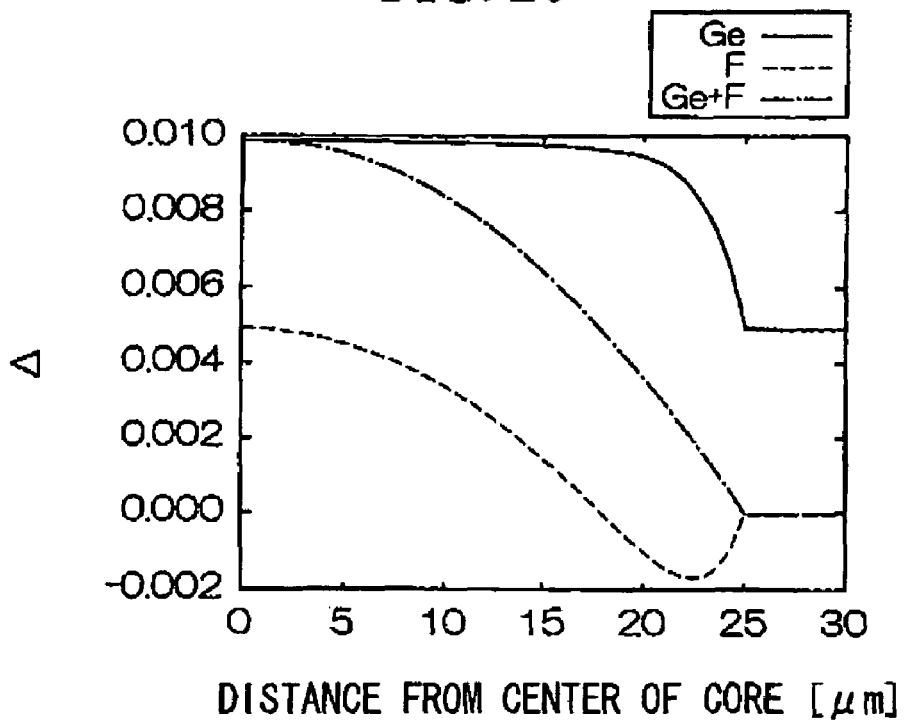
FIG. 20 is a graph illustrating relative refractive index differences $\Delta$ of a GI fiber with germanium and fluorine of the present invention optimized for $\lambda_0=0.80$ μm ($\Delta_{Ge}=\Delta_F=0.005$), and GI fibers doped only with either fluorine or with germanium.
Figure 21:
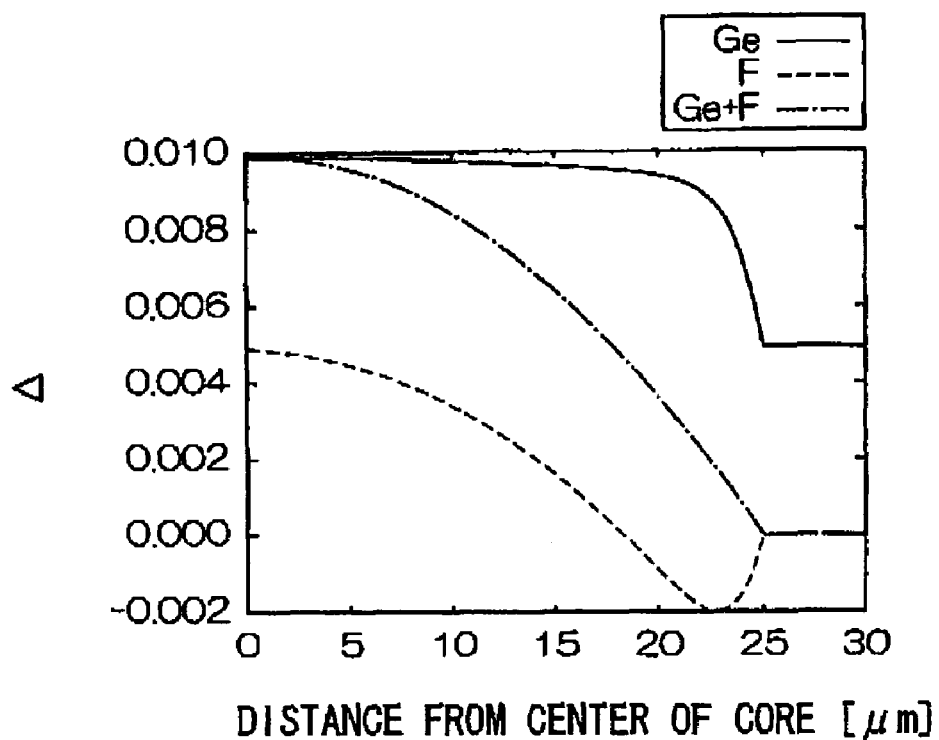
FIG. 21 is a graph illustrating relative refractive index differences $\Delta$ of a GI fiber with germanium and fluorine of the present invention optimized for $\lambda_0=0.85$ μm ($\Delta_{Ge}=\Delta_F=0.005$), and GI fibers doped only with either fluorine or with germanium.
Figure 22:
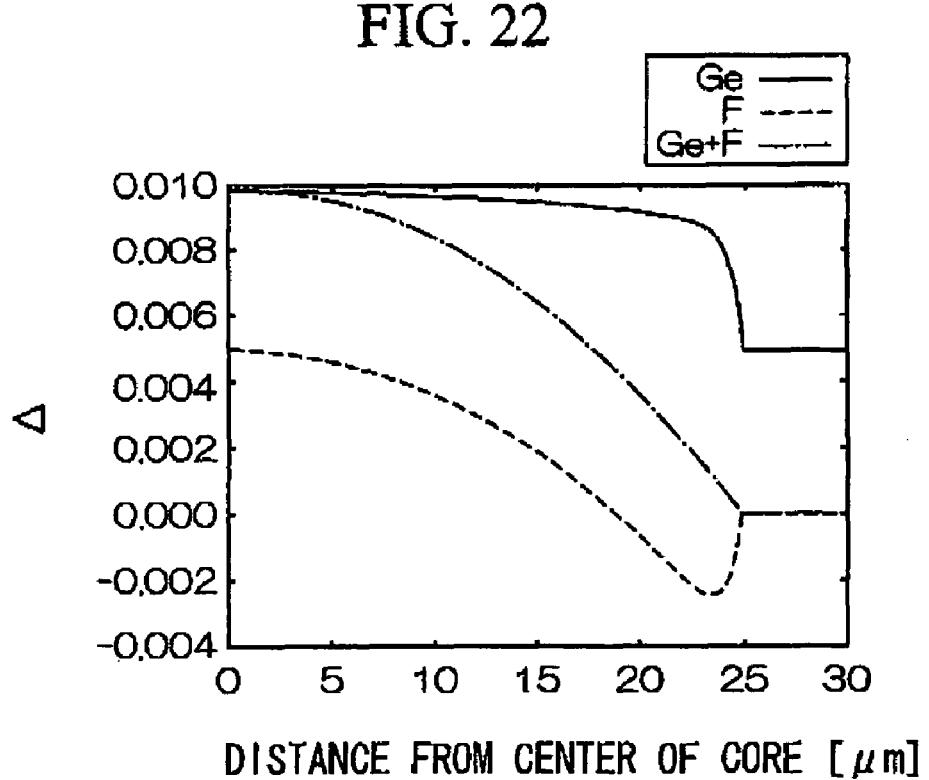
FIG. 22 is a graph illustrating relative refractive index differences $\Delta$ of a GI fiber with germanium and fluorine of the present invention optimized for $\lambda_0=0.90$ μm ($\Delta_{Ge}=\Delta_F=0.005$), and GI fibers doped only with either fluorine or with germanium.
Figure 23:
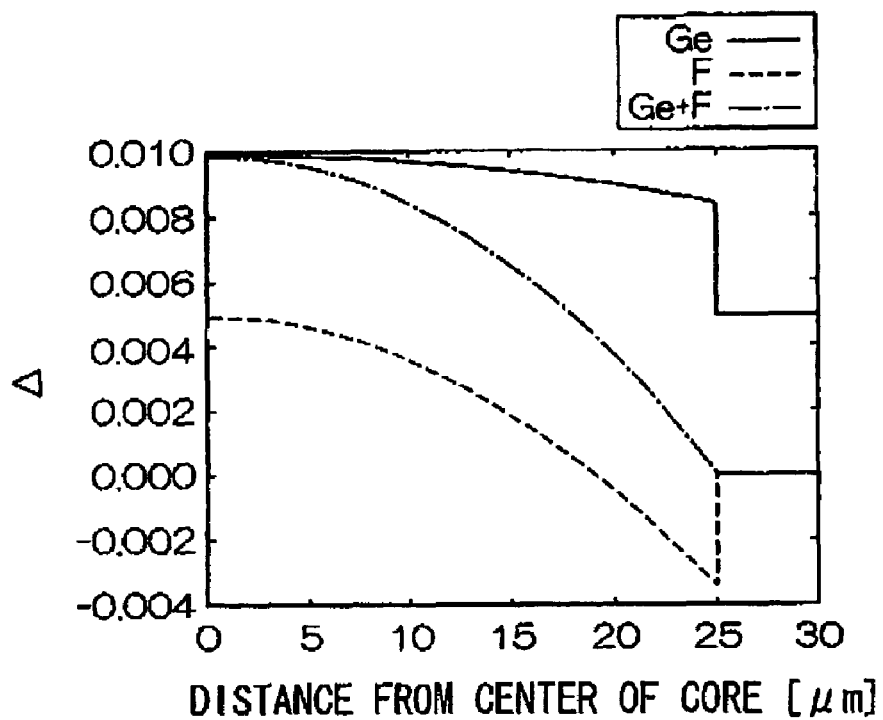
FIG. 23 is a graph illustrating relative refractive index differences $\Delta$ of a GI fiber with germanium and fluorine of the present invention optimized for $\lambda_0=0.95$ μm ($\Delta_{Ge}=\Delta_F=0.005$), and GI fibers doped only with either fluorine or with germanium.

Table 1 shows values of $\alpha_1$, $\alpha_2$, $X_G$, and $X_F$ at various center wavelengths. FIGS. 17 and 18 illustrate the relationships of $\alpha_1$ and $\alpha_2$ versus wavelength, respectively.

TABLE 1

| Center Wavelength $\lambda_0$ (μm) | $X_G$ | $X_F$ | $\alpha_1$ | $\alpha_2$ |
|---|---|---|---|---|
| 0.75 | 1.037 | 2.034 | 2.030 | 10.35 |
| 0.80 | 0.940 | 1.940 | 2.034 | 13.38 |
| 0.85 | 0.852 | 1.853 | 2.037 | 19.47 |
| 0.90 | 0.771 | 1.773 | 2.038 | 37.67 |
| 0.95 | 0.697 | 1.699 | 2.039 | 1888 |

In FIG. 18, a curve of $\alpha_2$ when $\lambda_0$ is 0.95 μm is omitted since the values of wavelength are extremely large. FIGS. 17 and 18 confirm that variations in $\alpha_1$ and $\alpha_2$ are zero for each of the designed center wavelengths $\lambda_0$.

Then, values of $\Delta_{Ge}$, $\Delta_F$, $X_G$, and $X_F$ are assigned into the following Formula (31) to obtain refractive index profiles of the optical fibers 30.

$$n^2(r) = n_G^2(r) + n_F^2(r) - n_S^2 \quad (31)$$

$$n_G^2 = n_1^2 - \delta_G\left[(1-X_G)\left(\frac{r}{a}\right)^{\alpha_1} + X_G\left(\frac{r}{a}\right)^{\alpha_2}\right],$$

$$n_F^2 = n_S^2 - \delta_F\left[X_F\left(\frac{r}{a}\right)^{\alpha_1} + (1-X_F)\left(\frac{r}{a}\right)^{\alpha_2}\right]$$

FIGS. 19-23 illustrate relative refractive index differences ($\Delta$) at $\lambda_0$ of 0.75 μm, 0.80 μm, 0.85 μm, 0.90 μm, and 0.95 μm, respectively. Additionally, GI fibers of comparative examples which were doped either with germanium or fluorine and optimized for various wavelengths are fabricated. The relative refractive index differences of GI fibers of comparative examples are also determined. The results are shown in FIGS. 19-23. In FIGS. 19-23, relative refractive index differences are determined with respect to the refractive index of a cladding doped with fluorine.

Transmission bandwidths of GI fibers optimized for various wavelengths are determined using the relative refractive index differences shown in FIGS. 19-23 according to the IEC 60793-1-49 Standard. Transmission bandwidth is defined as a product of a transmission rate and a length of an optical fiber, which is indicative of transmission capacity. The results are shown in FIG. 24.

Figure 25:
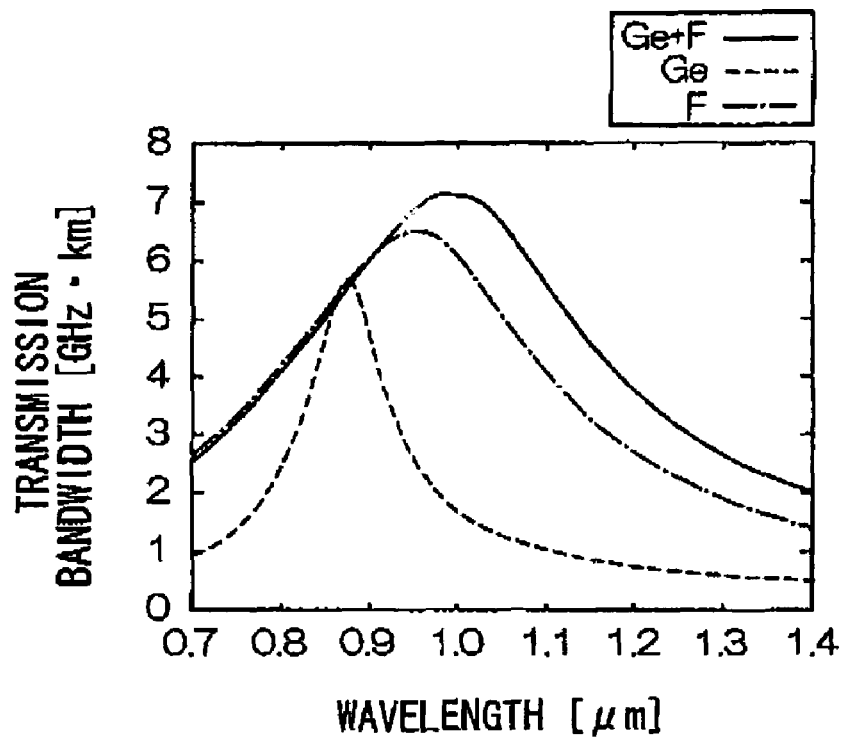
FIG. 25 is a graph illustrating transmission bandwidths of a GI fiber with germanium and fluorine of the present invention optimized for $\lambda_0=0.85$ μm ($\Delta_{Ge}=\Delta_F=0.005$), and GI fibers doped only with either fluorine or with germanium.

Transmission bandwidth performances of GI fibers 30 of the present invention having $\lambda_0$ of 0.85 μm and GI fibers doped either with germanium or fluorine and optimized for the same wavelength are compared. FIG. 25 shows the results of this comparison.

Figure 24:
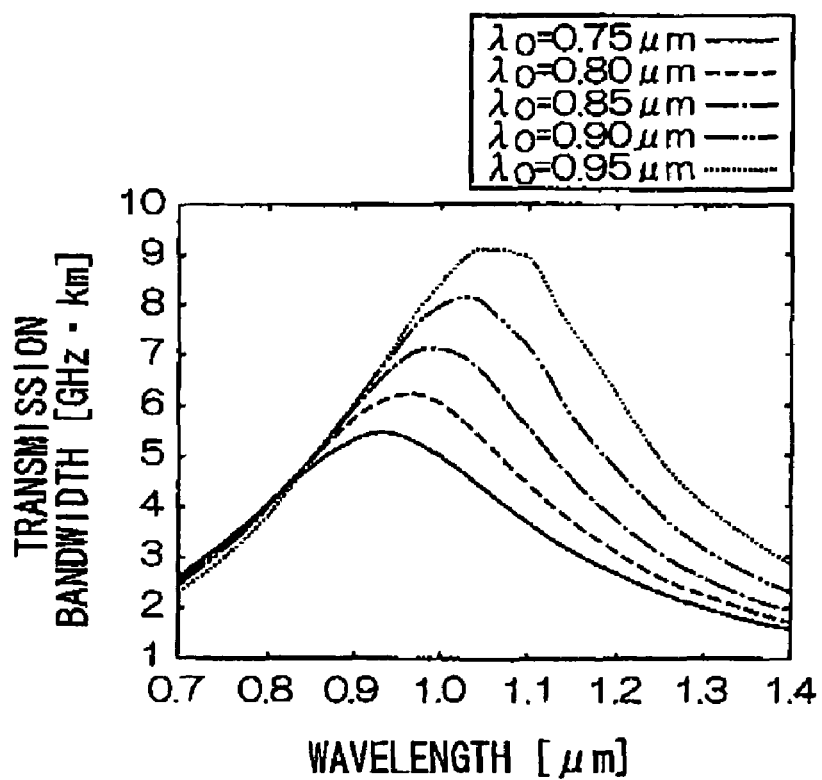
FIG. 24 is a graph of transmission bandwidth versus wavelength of GI fibers of the present invention designed for various wavelengths $\lambda_0$ ($\Delta_{Ge}=\Delta_F=0.005$)

In FIG. 24, the peaks of the transmission bandwidths shift toward a longer wavelength region with respect to $\lambda_0$ despite the fact that the designed center wavelength is $\lambda_0$. This is because chromatic dispersion decreases with increase in wavelength.

FIG. 24 indicates that the GI fiber with $\lambda_0$ of 0.95 μm has a widest transmission bandwidth at a broadest wavelength range.

FIG. 25 indicates that the GI fibers 30 of the present invention have better transmission bandwidth performance than the GI fibers doped either with germanium or fluorine and optimized for the same wavelengths.

EXAMPLE 6

Figure 26:
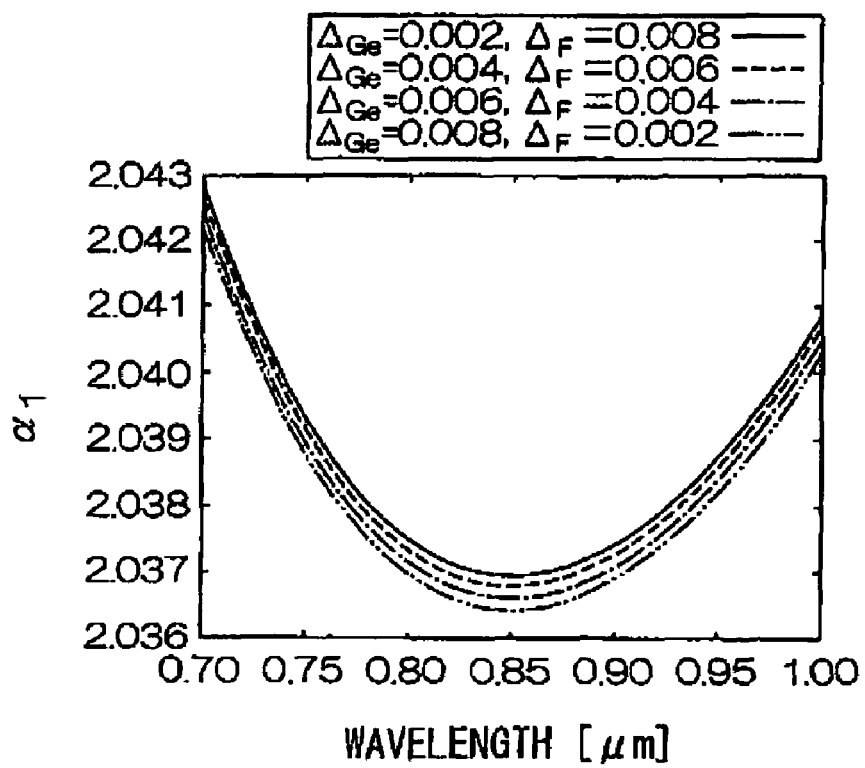
FIG. 26 is a graph of $\alpha_1$ versus wavelength when $\Delta_{Ge}+\Delta_F=0.01$, a=25 μm, and $\lambda_0=0.85$ μm while varying the ratio of $\Delta_{Ge}=\Delta_{in}$ to $\Delta_F=\Delta_{out}$.
Figure 27:
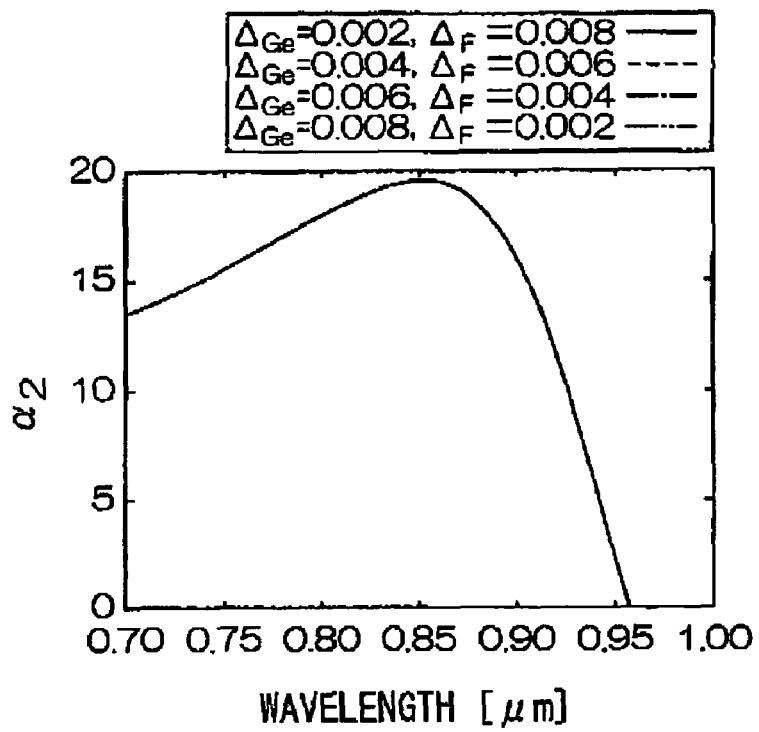
FIG. 27 is a graph of $\alpha_2$ versus wavelength when $\Delta_{Ge}+\Delta_F=0.01$, a=25 μm, and $\lambda_0=0.85$ μm while varying the ratio of $\Delta_{Ge}=\Delta_{in}$ to $\Delta_F=\Delta_{out}$.
Figure 28:
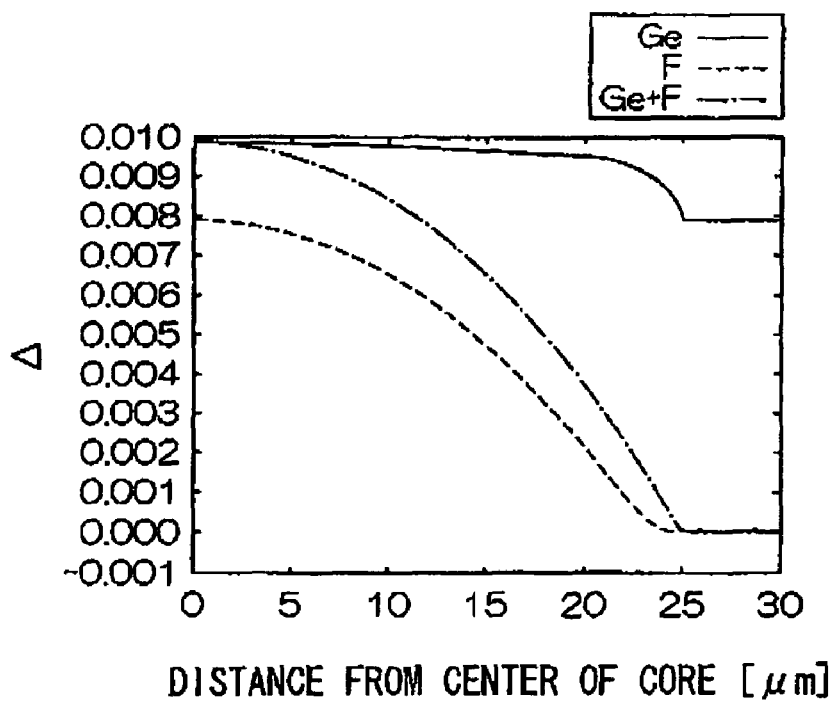
FIG. 28 is a graph illustrating relative refractive index differences $\Delta$ of a GI fiber with germanium and fluorine of the present invention optimized for $\lambda_0=0.85$ μm ($\Delta_{Ge}=0.002$ and $\Delta_F=0.008$), and GI fibers doped only with either fluorine or with germanium.
Figure 29:
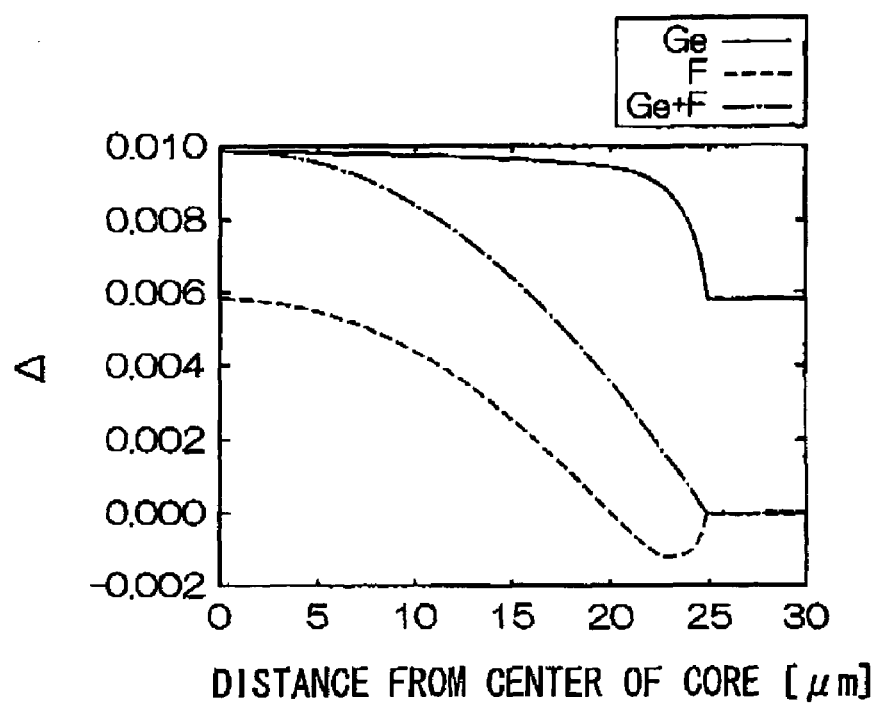
FIG. 29 is a graph illustrating relative refractive index differences $\Delta$ of a GI fiber with germanium and fluorine of the present invention optimized for $\lambda_0=0.85$ μm ($\Delta_{Ge}=0.004$ and $\Delta_F=0.006$), and GI fibers doped only with either fluorine or with germanium.
Figure 30:
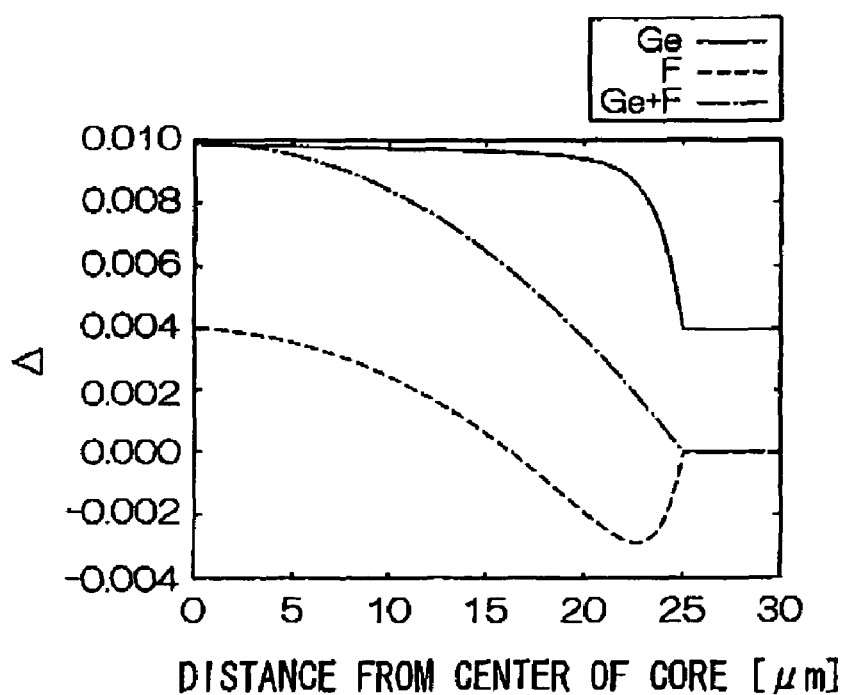
FIG. 30 is a graph illustrating relative refractive index differences $\Delta$ of a GI fiber with germanium and fluorine of the present invention optimized for $\lambda_0=0.85$ μm ($\Delta_{Ge}=0.006$ and $\Delta_F=0.004$), and GI fibers doped only with either fluorine or with germanium.
Figure 31:
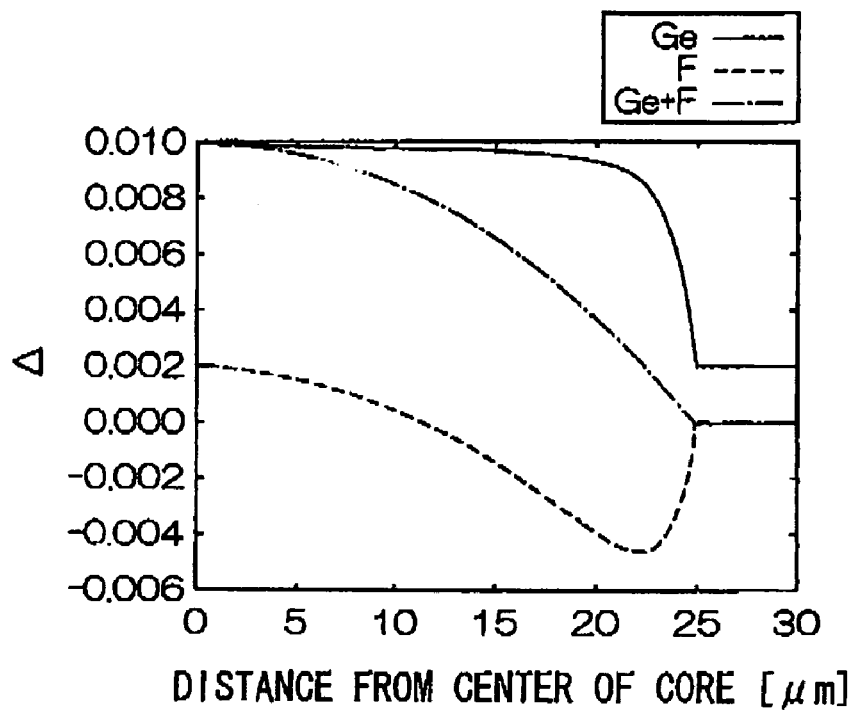
FIG. 31 is a graph illustrating relative refractive index differences $\Delta$ of a GI fiber with germanium and fluorine of the present invention optimized for $\lambda_0=0.85$ μm ($\Delta_{Ge}=0.008$ and $\Delta_F=0.002$), and GI fibers doped only with either fluorine or with germanium.

Similar to Example 5, GI fibers 30 are designed under the conditions that $\Delta_{Ge}+\Delta_F=0.01$ and $\lambda_0=0.85$ μm while varying the ratio of $\Delta_{Ge}$ to $\Delta_F$. The values of $\Delta_{Ge}$, $\Delta_F$, $\alpha_1$, $\alpha_2$, $X_G$, and $X_F$ in this example are listed in Table 2. FIGS. 26 and 27 show the relationships of $\alpha_1$ and $\alpha_2$ versus wavelength, respectively.

TABLE 2

| $\Delta_{Ge}$ | $\Delta_F$ | $X_G$ | $X_F$ | $\alpha_1$ | $\alpha_2$ |
|---|---|---|---|---|---|
| 0.002 | 0.008 | 0.6578 | 1.165 | 2.037 | 19.47 |
| 0.004 | 0.006 | 0.8195 | 1.547 | 2.037 | 19.47 |
| 0.006 | 0.004 | 0.8734 | 2.312 | 2.037 | 19.47 |
| 0.008 | 0.002 | 0.9004 | 4.607 | 2.037 | 19.47 |

Table 2 and FIGS. 26 and 27 indicate that $\alpha_1$ and $\alpha_2$ change little with change in wavelength even when the ratio of $\Delta_{Ge}$ to $\Delta_F$ was varied. Variations in both $\alpha_1$ and $\alpha_2$ are zero at the designed center wavelengths $\lambda_0$ Similar to Example 5, relative refractive index differences of the optical fibers 30 are determined using the values of $\Delta_{Ge}$, $\Delta_F$, $X_G$, and $X_F$. FIGS. 28-31 illustrate relative refractive index differences when $\Delta_{Ge}=0.002$ and $\Delta_F=0.008$, $\Delta_{Ge}=0.004$ and $\Delta_F=0.006$, $\Delta_{Ge}=0.006$ and $\Delta_F=0.004$, and $\Delta_{Ge}=0.008$ and $\Delta_F=0.002$, respectively. Additionally, GI fibers of comparative examples doped either with germanium or fluorine and optimized for various wavelengths are fabricated. The relative refractive index differences of GI fibers of comparative examples are determined. The results are shown in FIGS. 19-23. Relative refractive index differences are determined with respect to the refractive index of a cladding doped with fluorine.

Transmission bandwidths of GI fibers optimized for various wavelengths are determined using the relative refractive index differences shown in FIGS. 28-31 according to the IEC 60793-1-49 Standard. The results are shown in FIG. 32.

Figure 32:
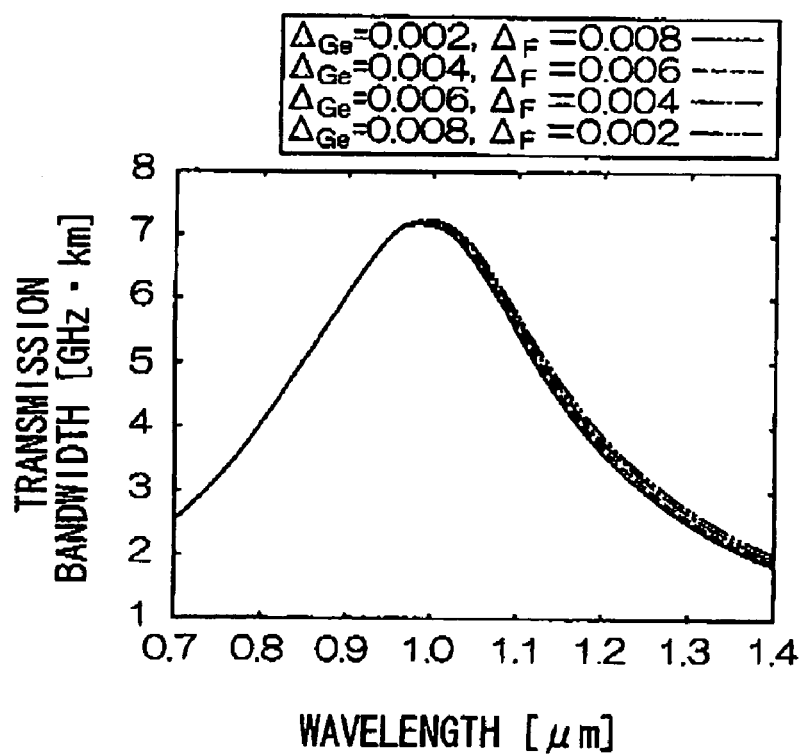
FIG. 32 is a graph of transmission bandwidth versus wavelength of GI fibers of the present invention when $\Delta_{Ge}+\Delta_F=0.01$, a=25 μm, and $\lambda_0=0.85$ μm while varying the ratio of $\Delta_{Ge}=\Delta_{in}$ to $\Delta_F=\Delta_{out}$.

FIG. 32 shows that transmission bandwidths change little with changes in wavelength even when the ratio of $\Delta_{Ge}$ to $\Delta_F$ is varied. This means that using the manufacturing method of GI fiber according to the present invention, the amounts of germanium and fluorine which are controllable during manufacturing can be selected without incurring deterioration of transmission bandwidth performance.

EXAMPLE 7

Figure 33:
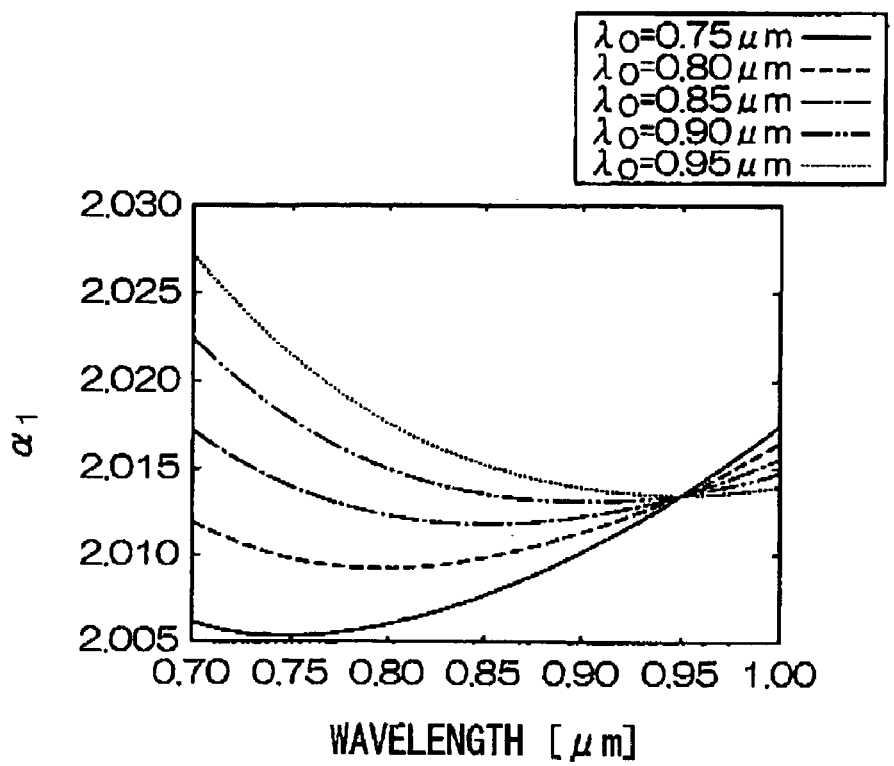
FIG. 33 is a graph of $\alpha_1$ versus wavelength when $\Delta_{Ge}=\Delta_F=0.01$, a=31.25 μm, and $\lambda_0$ is between 0.75 μm and 0.95 μm.
Figure 34:
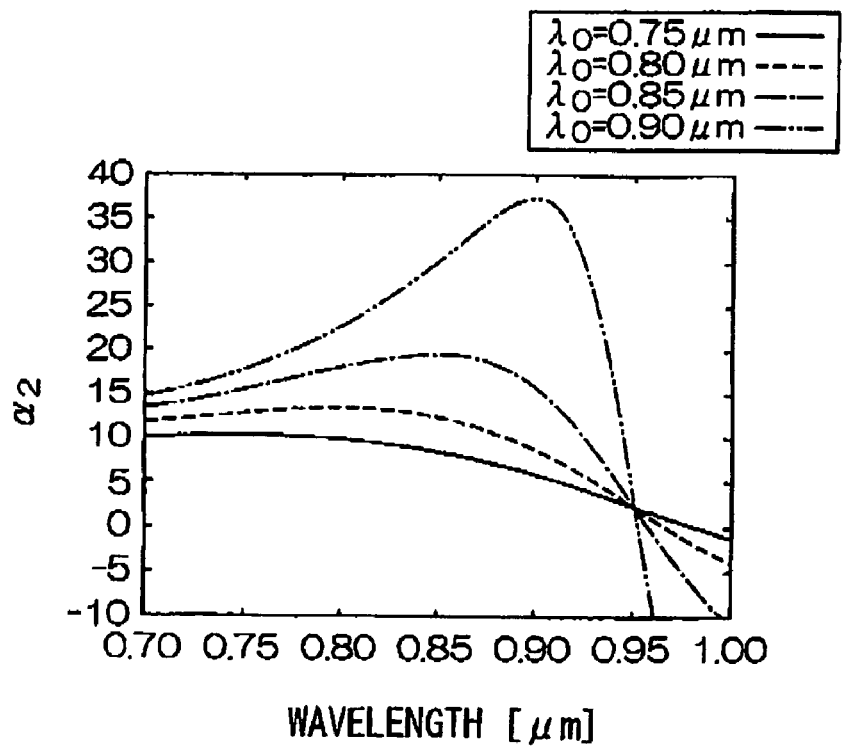
FIG. 34 is a graph of $\alpha_2$ versus wavelength when $\Delta_{Ge}=\Delta_F=0.01$, a=31.25 μm, and $\lambda_0$ is between 0.75 μm and 0.95 μn.
Figure 35:
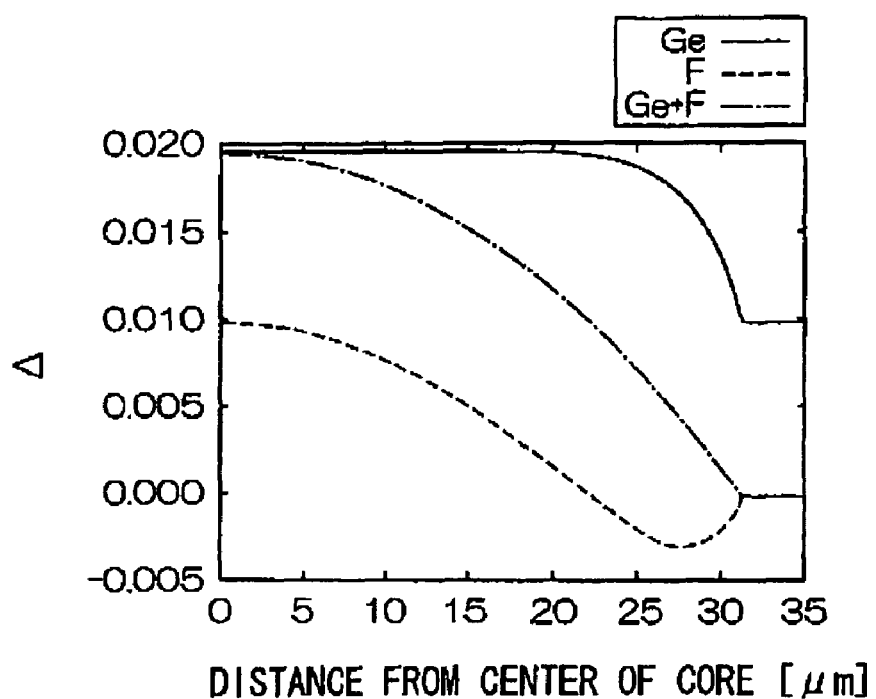
FIG. 35 is a graph illustrating relative refractive index differences $\Delta$ of a GI fiber with germanium and fluorine of the present invention optimized for $\lambda_0=0.75$ μm ($\Delta_{Ge}=\Delta_F=0.01$), and GI fibers doped only with either fluorine or with germanium.
Figure 36:
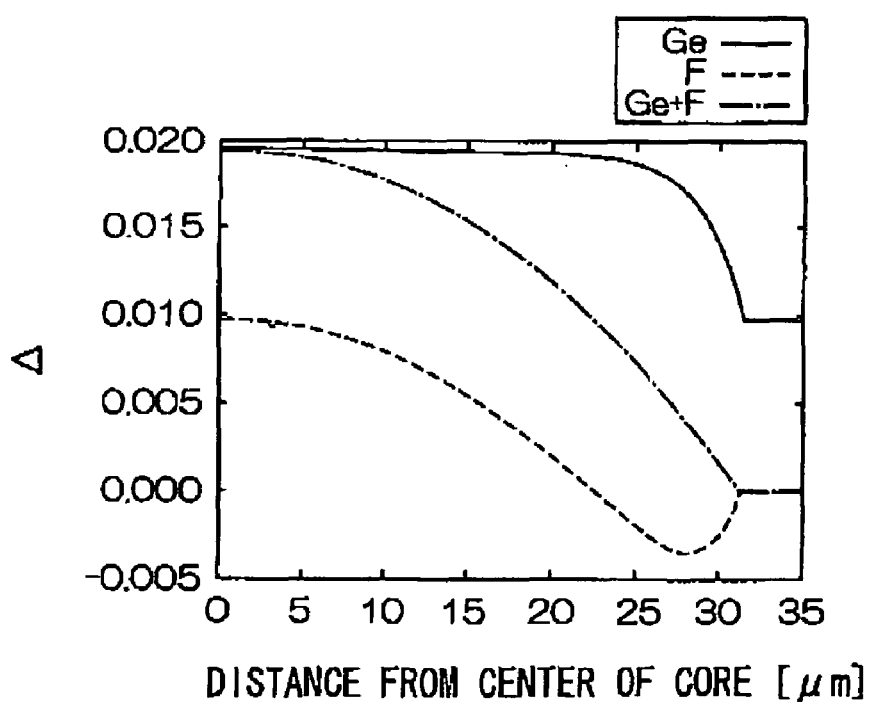
FIG. 36 is a graph illustrating relative refractive index differences $\Delta$ of a GI fiber with germanium and fluorine of the present invention optimized for $\lambda_0=0.80$ μm ($\Delta_{Ge}=\Delta_F=0.01$), and GI fibers doped only with either fluorine or with germanium.
Figure 37:
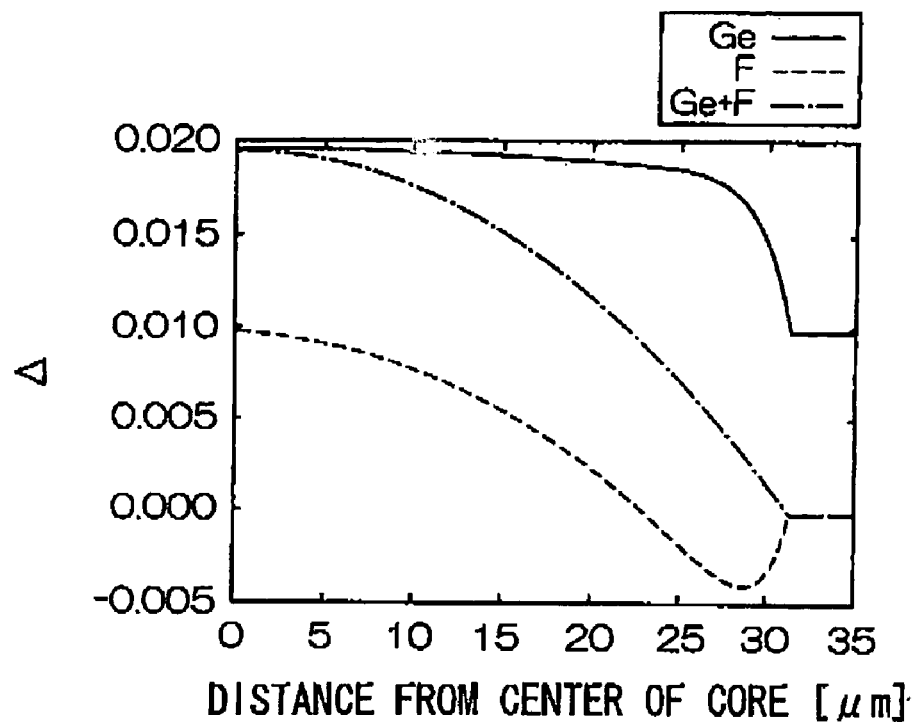
FIG. 37 is a graph illustrating relative refractive index differences Δ of a GI fiber with germanium and fluorine of the present invention optimized for $\lambda_0$=0.85 μm ($\Delta_{Ge}=\Delta_F$=0.01), and GI fibers doped only with either fluorine or with germanium.
Figure 38:
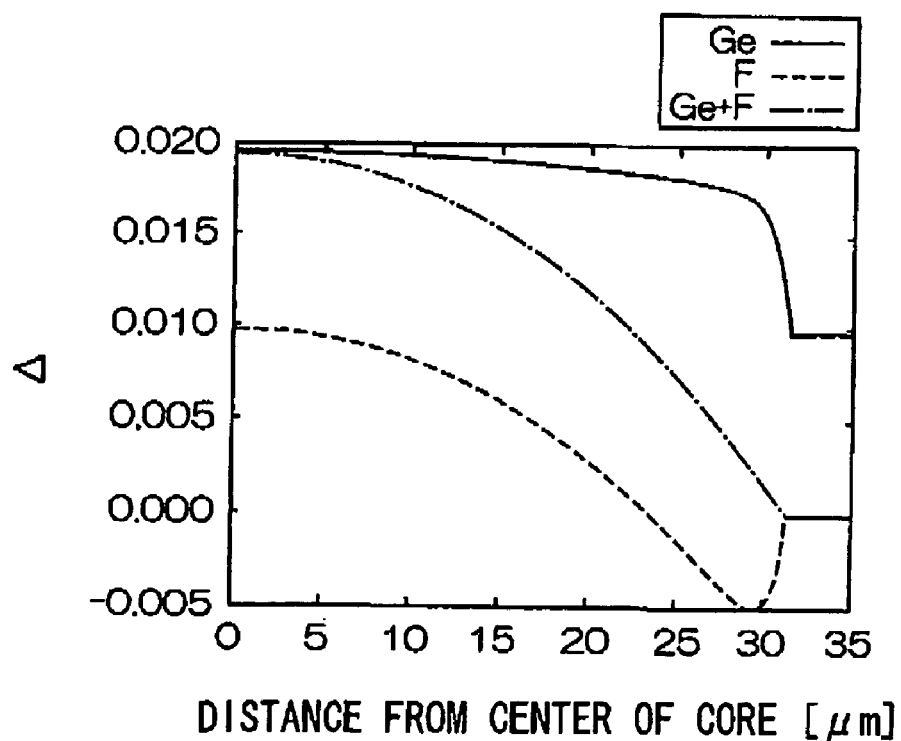
FIG. 38 is a graph illustrating relative refractive index differences Δ of a GI fiber with germanium and fluorine of the present invention optimized for $\lambda_0$=0.90 μm ($\Delta_{Ge}=\Delta_F$=0.01), and GI fibers doped only with either fluorine or with germanium.
Figure 39:
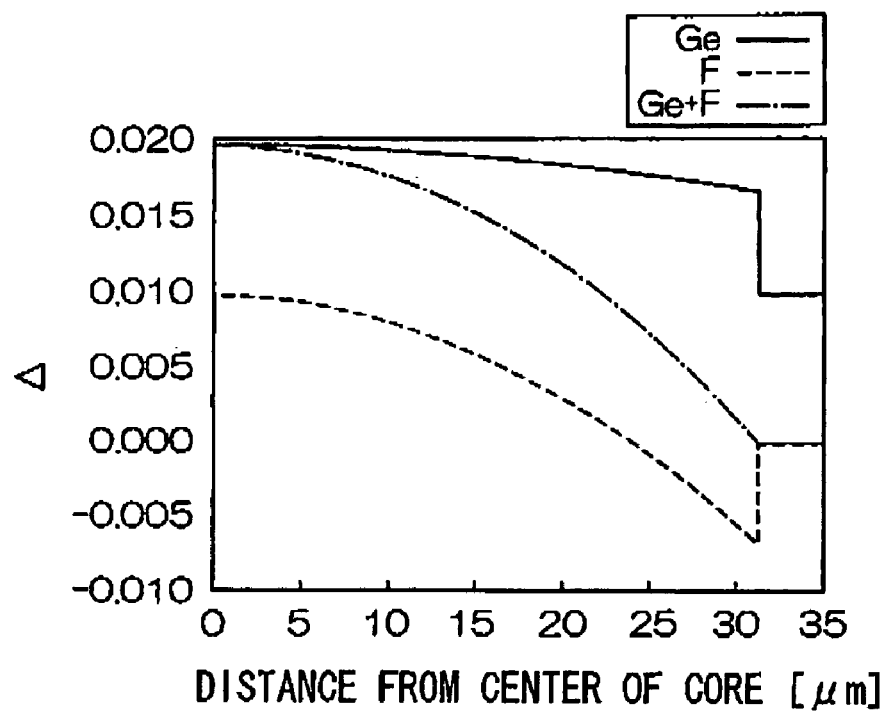
FIG. 39 is a graph illustrating relative refractive index differences Δ of a GI fiber with germanium and fluorine of the present invention optimized for $\lambda_0$=0.95 μm ($\Delta_{Ge}=\Delta_F$=0.01), and GI fibers doped only with either fluorine or with germanium.

Similar to Example 5, GI fibers 30 doped with both germanium and fluorine having the following parameters are designed with $\Delta_{Ge}$ and $\Delta_F$ of 0.01, a core radius "a" of 31.25 μm, and the center wavelengths $\lambda_0$ of between 0.75 μm and 0.95 μm. Table 3 shows values of $\alpha_1$, $\alpha_2$, $X_G$, and $X_F$. FIGS. 33 and 34 illustrate the relationships of $\alpha_1$ and $\alpha_2$ versus wavelength, respectively.

TABLE 3

| Center Wavelength $\lambda_0$ (μm) | $X_G$ | $X_F$ | $\alpha_1$ | $\alpha_2$ |
|---|---|---|---|---|
| 0.75 | 1.016 | 2.033 | 2.005 | 10.30 |
| 0.80 | 0.921 | 1.940 | 2.009 | 13.30 |
| 0.85 | 0.835 | 1.854 | 2.012 | 19.33 |
| 0.90 | 0.757 | 1.774 | 2.013 | 37.17 |
| 0.95 | 0.684 | 1.700 | 2.014 | 1112 |

In FIG. 34, a curve of $\alpha_2$ when $\lambda_0$ is 0.95 μm is omitted since the wavelength values are extremely large. FIGS. 33 and 34 confirm that variations in $\alpha_1$ and $\alpha_2$ are zero for each of the designed center wavelengths $\lambda_0$.

Also, similar to Example 5, refractive index profiles of the optical fibers are determined using the values of $\Delta_{Ge}$, $\Delta_F$, $X_G$, and $X_F$.

FIGS. 35-39 illustrate relative refractive index differences at $\lambda_0$ of 0.75 μm, 0.80 μm, 0.85 μm, 0.90 μm, and 0.95 μm, respectively. Additionally, relative refractive index differences of GI fibers of comparative examples doped either with germanium or fluorine and optimized for various wavelengths $\lambda_0$ are determined. The results are shown in the drawing. In FIGS. 35-39, relative refractive index differences are determined with respect to the refractive index of a cladding doped with fluorine.

Figure 40:
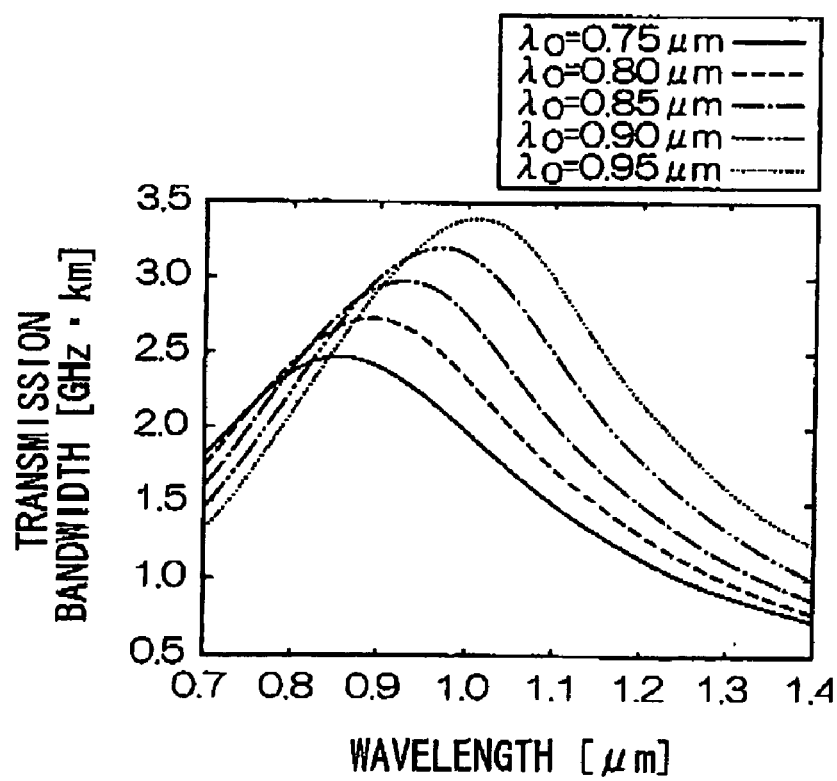
FIG. 40 is a graph of transmission bandwidth versus wavelength of GI fibers of the preset invention when $\Delta_{Ge}=\Delta_F$=0.01, a=31.25 μm, and $\lambda_0$ is between 0.75 μm and 0.95 μm.
Figure 41:
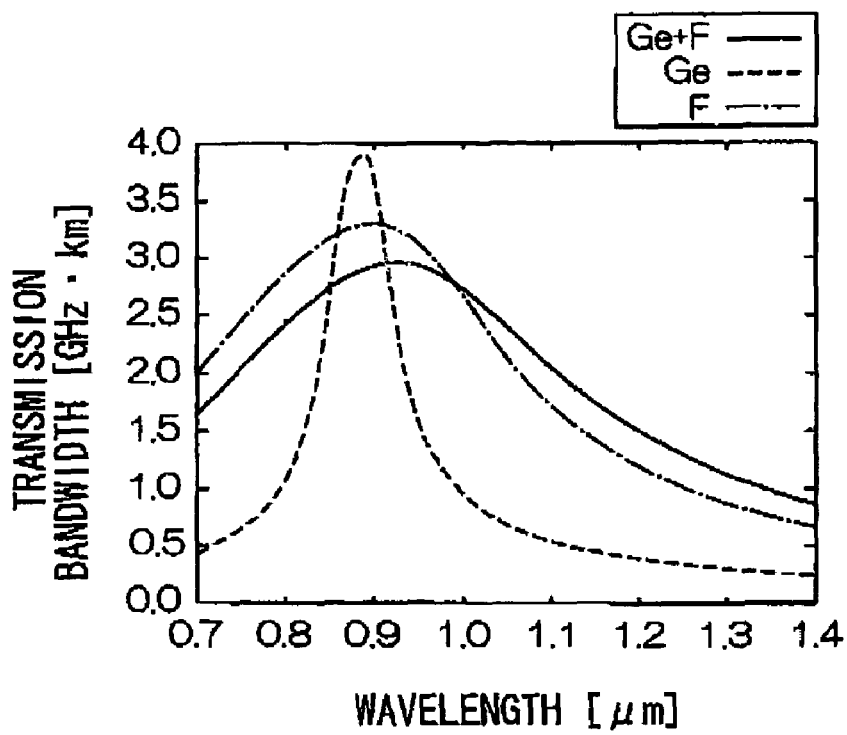
FIG. 41 is a graph illustrating transmission bandwidths of a GI fiber of the present invention with $\Delta_{Ge}=\Delta_F$=0.01, a=31.25 μm, and A=0.85 μm, and GI fibers doped only with either fluorine or with germanium.

Transmission bandwidths of GI fibers optimized for various wavelengths $\lambda_0$ are determined using the relative refractive index difference shown in FIGS. 35-39 according to the IEC 60793-1-49 Standard. The results are shown in FIG. 40. FIG. 41 compares transmission bandwidth performances of GI fibers 30 of the present invention having $\lambda_0$ of 0.85 μm and GI fibers which were doped either with germanium or fluorine and optimized for the same wavelength.

In FIG. 40, the reason why the peak of the transmission bandwidth with respect to $\lambda_0$ shifts toward longer wavelength regions although the designed center wavelength $\lambda_0$ is zero, is that chromatic dispersion increases with increase in wavelength, similar to Example 5.

FIG. 41 indicates that even though the GI fibers 30 of the present invention have a shorter transmission bandwidth than the GI fibers doped either with germanium or fluorine and optimized for the same wavelengths, the fibers of the present invention can maintain a relatively wider transmission bandwidth at a long wavelength range.

EXAMPLE 8

Similar to Example 5, GI fibers 30 are designed under the conditions that $\Delta_{Ge}+\Delta_F=0.02$ and $\lambda_0=0.85$ μm while varying the ratio of $\Delta_{Ge}$ to $\Delta_F$. The values of $\Delta_{Ge}$, $\Delta_F$, $\alpha_1$, $\alpha_2$, $X_G$, and $X_F$ in this example are listed in Table 4. The relationship of $\alpha_1$ and $\alpha_2$ versus wavelength are shown in FIGS. 42 and 43.

TABLE 4

| $\Delta_{Ge}$ | $\Delta_F$ | $X_G$ | $X_F$ | $\alpha_1$ | $\alpha_2$ |
|---|---|---|---|---|---|
| 0.004 | 0.016 | 0.6461 | 1.165 | 2.013 | 19.34 |
| 0.008 | 0.012 | 0.8039 | 1.547 | 2.012 | 19.33 |
| 0.012 | 0.008 | 0.8564 | 2.313 | 2.012 | 19.32 |
| 0.016 | 0.004 | 0.8825 | 4.608 | 2.011 | 19.32 |

Figure 42:
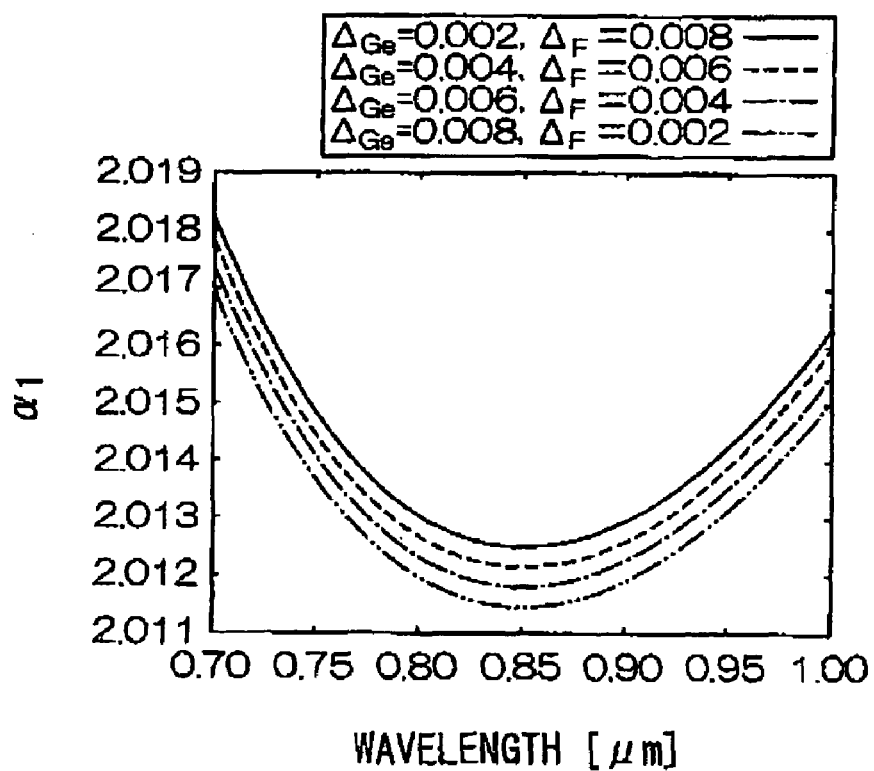
FIG. 42 is a graph of $\alpha_1$ versus wavelength when $\Delta_{Ge}+\Delta_F$=0.02, a=31.25 μm, and $\lambda_0$=0.85 μm while varying the ratio of $\Delta_{Ge}=\Delta_{in}$ to $\Delta_F=\Delta_{out}$.
Figure 43:
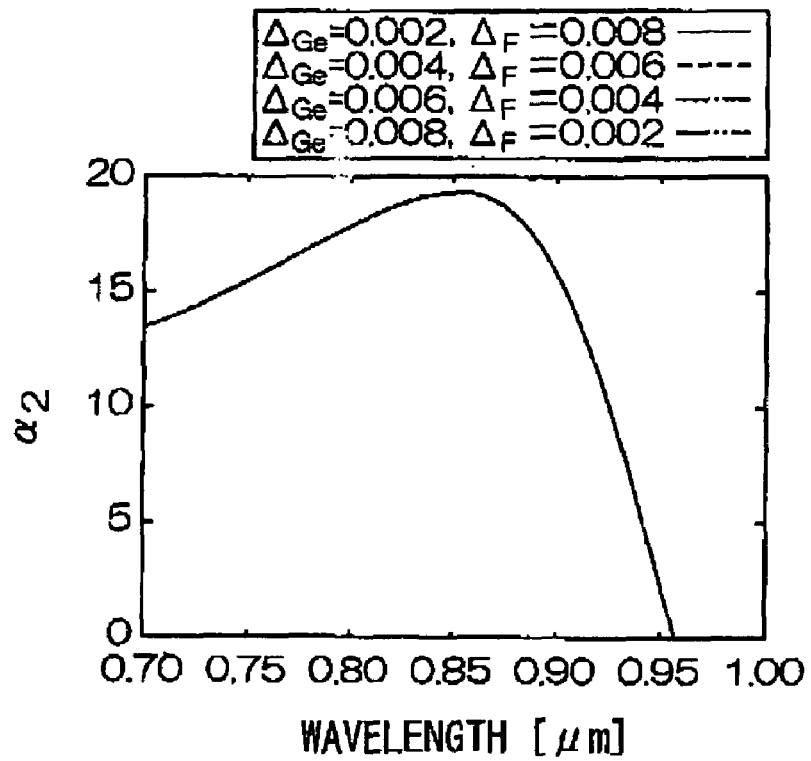
FIG. 43 is a graph of $\alpha_2$ versus wavelength when $\Delta_{Ge}+\Delta_F$=0.02, a=31.25 μm, and $\lambda_0$=0.85 μm while varying the ratio of $\Delta_{Ge}=\Delta_{in}$ to $\Delta_F=\Delta_{out}$.
Figure 44:
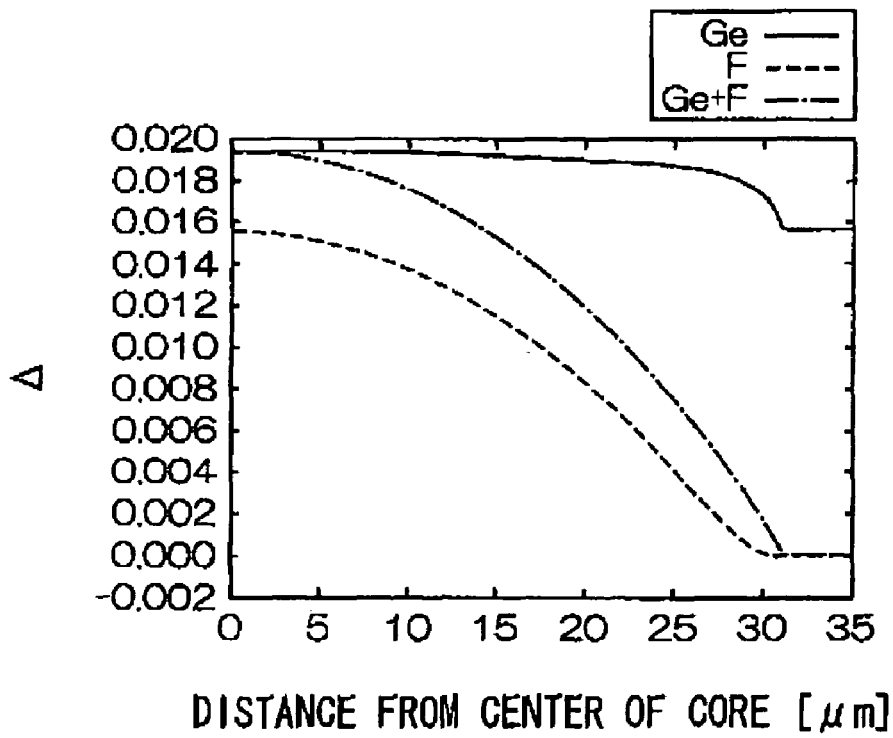
FIG. 44 is a graph illustrating relative refractive index differences Δ of a GI fiber with germanium and fluorine of the present invention optimized for $\lambda_0$=0.85 μm ($\Delta_{Ge}$=0.004 and $\Delta_F$=0.016), and GI fibers doped only with either fluorine or with germanium.
Figure 45:
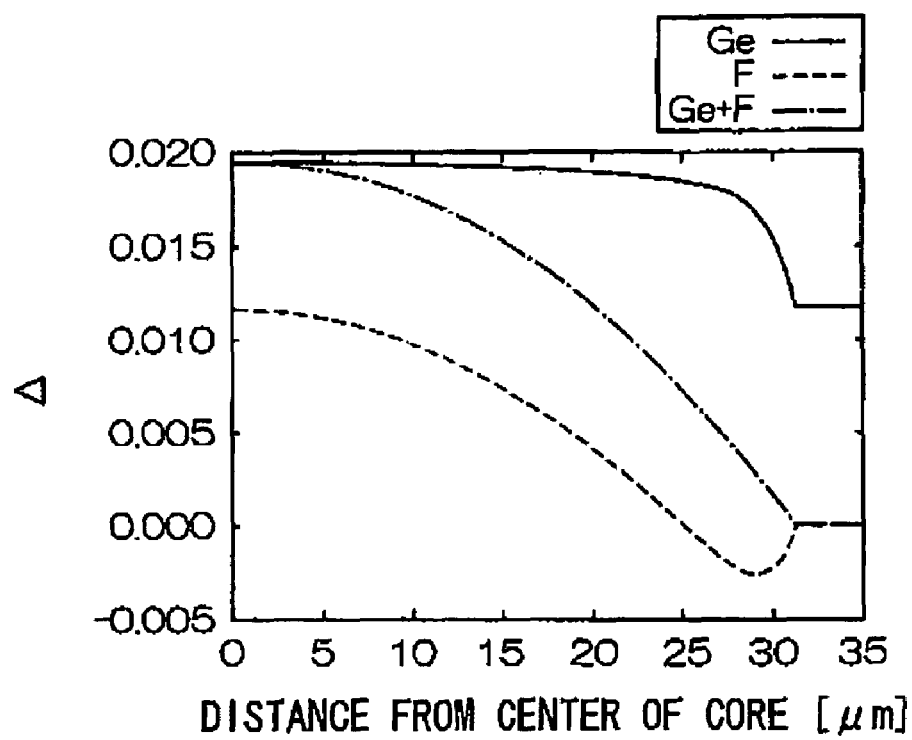
FIG. 45 is a graph illustrating relative refractive index differences Δ of a GI fiber with germanium and fluorine of the present invention optimized for $\lambda_0$=0.85 μm ($\Delta_{Ge}$=0.008 and $\Delta_F$=0.012), and GI fibers doped only with either fluorine or with germanium.
Figure 46:
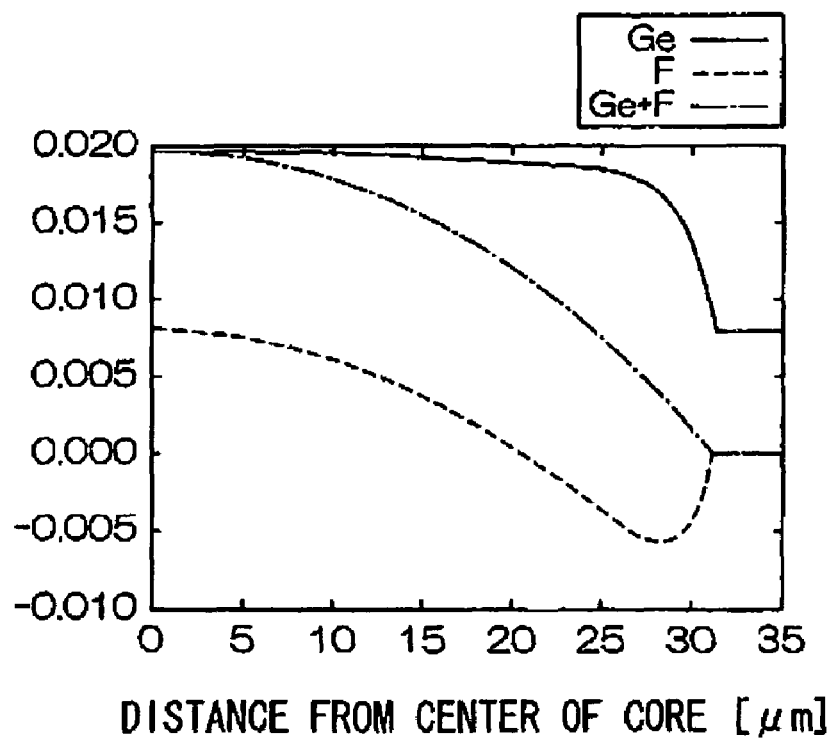
FIG. 46 is a graph illustrating relative refractive index differences Δ of a GI fiber with germanium and fluorine of the present invention optimized for $\lambda_0$=0.85 μm ($\Delta_{Ge}$=0.012 and $\Delta_F$=0.008), and GI fibers doped only with either fluorine or with germanium.
Figure 47:
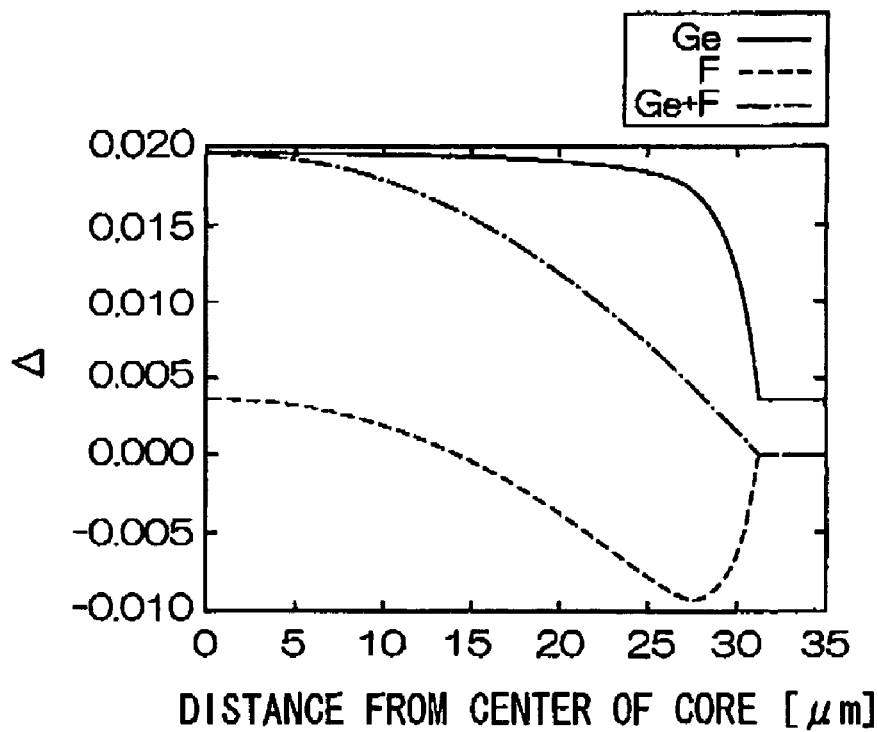
FIG. 47 is a graph illustrating relative refractive index differences Δ of a GI fiber with germanium and fluorine of the present invention optimized for $\lambda_0$=0.85 μm ($\Delta_{Ge}$=0.016 and $\Delta_F$=0.004), and GI fibers doped only with either fluorine or with germanium.

Table 4 and FIGS. 42 and 43 indicate that $\alpha_1$ and $\alpha_2$ change little with changes in wavelength even though the ratio of $\Delta_{Ge}$ to $\Delta_F$ is varied. Variations in both $\alpha_1$ and $\alpha_2$ as zero for each of the designed center wavelengths $\lambda_0$ at $\lambda_0$ of 0.85 μm.

Similar to Example 5, relative refractive index differences of the optical fibers are determined using the values of $\Delta_{Ge}$, $\Delta_F$, $X_G$, and $X_F$. FIGS. 44-47 illustrate relative refractive index differences when $\Delta_{Ge}=0.004$ and $\Delta_F=0.016$, $\Delta_{Ge}=0.008$ and $\Delta_F=0.012$, $\Delta_{Ge}=0.012$ and $\Delta_F=0.008$, and $\Delta_{Ge}=0.016$ and $\Delta_F=0.004$, respectively. Additionally, GI fibers of comparative examples doped either with germanium or fluorine and optimized for various wavelengths are fabricated. The relative refractive index differences of GI fibers of comparative examples are determined, and the results are shown in FIGS. 44-47. Relative refractive index differences are determined with respect to the refractive index of a cladding doped with fluorine.

Transmission bandwidths of GI fibers optimized for various wavelengths are determined using the relative refractive index differences shown in FIGS. 44-47 according to the IEC 60193-1-49 Standard. The results are shown in FIG. 48.

Figure 48:
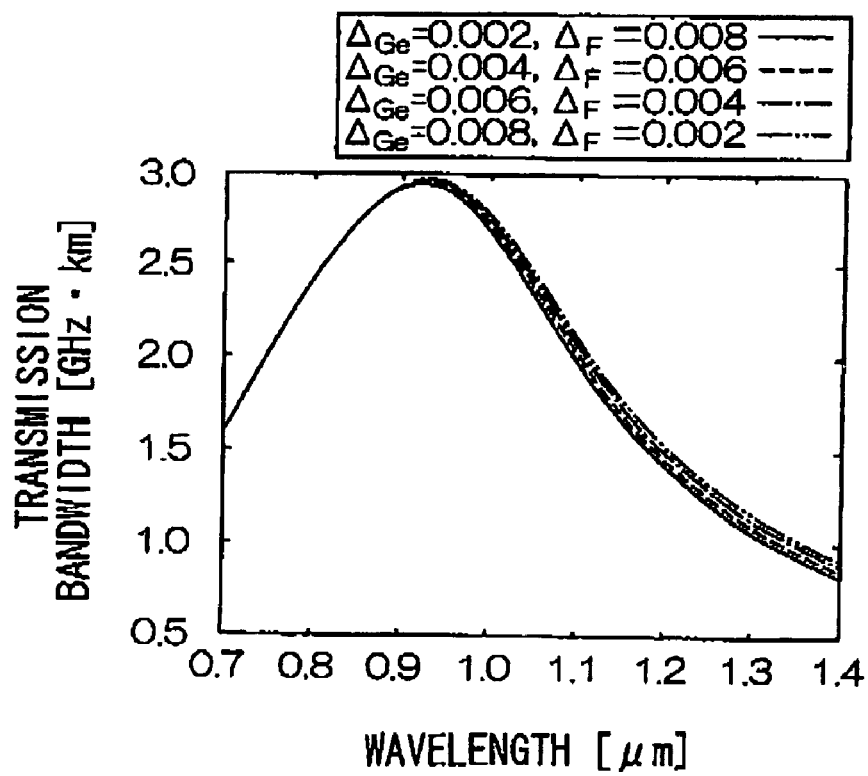
FIG. 48 is a graph of transmission bandwidth versus wavelength of GI fibers of the present invention when $\Delta_{Ge}+\Delta_F$=0.02, a=31.25 μm, and $\lambda_0$=0.85 μm while varying the ratio of $\Delta_{Ge}=\Delta_{in}$ to $\Delta_F=\Delta_{out}$.

FIG. 48 shows that transmission bandwidths change little with changes in wavelength even when the ratio of $\Delta_{Ge}$ to $\Delta_F$ is varied. This means that using the manufacturing method of GI fiber according to the present invention, the amounts of germanium and fluorine which are controllable during manufacturing can be selected without incurring deterioration of transmission bandwidth performance.

Since GI fibers according to the second exemplary aspect of the present invention are co-doped with germanium and fluorine which provide an excellent transmission loss performance so that variations in $\alpha_1$ and $\alpha_2$ at a center wavelength $\lambda_0$ become zero. Thus, a wide transmission bandwidth is maintained around $\lambda_0$.

The above-mentioned effect is further enhanced when selecting $\Delta$ of not less than 0.005 and not more than 0.025, and an "a" of not less than 10 μm and not more than 35 μm. The manufacturing method of GI fiber according to the present invention provides GI fibers having $\Delta$ of 0.019 or more and a transmission bandwidth of 1.5 GHz·km or greater at wavelength $\lambda$ of not less than 0.8 μm and not more than 1.4 μm. Thus a wide transmission bandwidth is obtained. The manufacturing method of GI fiber according to the present invention provides GI fibers having $\Delta$ of 0.009 or more and a transmission bandwidth of 3 GHz·km or greater at wavelength $\lambda$ of not less than 0.8 μm and not more than 1.3 μm, obtaining a very wide transmission bandwidth. Such GI fibers are suitable for wavelength division multiplexing.

While exemplary embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A graded-index multimode fiber comprising:
   a silica glass core comprising a central region and an outer peripheral region; and
   a cladding provided at an outer periphery of the core,
   wherein the central region of the core contains one of germanium and phosphorus, and the outer peripheral region of the core contains fluorine, and
   the graded-index multimode fiber has a refractive index profile which satisfies the following:

$$n(r) = \begin{cases} n_1[1-F(r)]^{1/2} & (0 \leq r \leq a) \\ n_1[1-F(a)]^{1/2} & (r > a) \end{cases}$$

$$F(r) = \begin{cases} 2\Delta_1\left(\dfrac{r}{a_0}\right)^{\alpha_1} & r < a_0 \\ 2\Delta_2\left(\dfrac{r}{a}\right)^{\alpha_2} & a_0 \leq r \leq a \end{cases}$$

$$n_1^2\left[1-2\Delta_2\left(\dfrac{a_0}{a}\right)^{\alpha_2}\right] = n_0^2$$

$$n_1^2[1-2\Delta_1] = n_0^2$$

wherein $n(r)$ is a refractive index of the fiber at a distance "r" from the center of the core, $n_1$ is a refractive index at the center of the core, $\Delta_1$ is a maximum relative refractive index difference of one of germanium and phosphorus contained in the central region of the core with respect to the cladding, $\Delta_2$ is a maximum relative refractive index difference of fluorine contained in the central region of the core with respect to the cladding, "a" is a core radius, and $\alpha_1$ is a refractive index profile exponential parameter of the one of germanium and phosphorus contained in the central region of the core, $\alpha_2$ is a refractive index profile exponential parameter of fluorine contained in the outer peripheral region of the core, $a_0$ is a distance between the central and outer peripheral regions of the core, and $n_0$ is a refractive index of pure silica.

2. The graded-index multimode fiber according to claim 1, wherein each of the refractive index profile exponential parameters $\alpha_1$ and $\alpha_2$ has a value which maximizes transmission bandwidth at an operating wavelength region.

3. A method for manufacturing a graded-index multimode fiber, the graded-index multimode fiber comprising a core and a cladding and being essentially made of silica glass, the graded-index multimode fiber being doped with germanium and fluorine, the graded-index multimode fiber having a refractive index $n(r)$ at a distance "r" from the center of the core, comprising forming the graded-index multimode fiber, wherein germanium and fluorine are doped so that a variation in a refractive index profile exponential parameter $\alpha_i$ ($i = 1, 2$) with a change in wavelength becomes zero; and $$n(r) = \begin{cases} n_1[1-F(r)]^{1/2} & (0 \leq r \leq a) \\ n_1[1-F(a)]^{1/2} & (r > a) \end{cases}$$

-continued $$F(r) = \sum_{i=1}^{2} 2\Delta_i \left(\frac{r}{a}\right)^{\alpha_i}$$

$$\alpha_i = 2 - 2\frac{n_1}{N_1}\frac{\lambda}{\Delta_i}\frac{d\Delta_i}{d\lambda} - \frac{12}{5}\Delta$$

wherein F is a fiber shape function, $\Delta=\Delta_1+\Delta_2$, is a refractive index at the center of the core, $N_1$ is a group index at the center of the core, "a" is a core radius, $\lambda$ is a wavelength, $\Delta_i$ is a relative refractive index difference at the center of the core with respect to the cladding for each of the refractive index profiles, and i=1 or 2 representing gennanium or fluorine.

4. The method of claim 3, wherein the manufactured graded-index multimode fiber has a relative refractive index difference $\Delta$ of not less than 0.005 and not more than 0.025, and a core radius "a" of not less than 10 µm and not more than 35 µm.

5. The method of claim 4, wherein the relative refractive index difference $\Delta$ is 0.019 or greater and transmission bandwidth is greater than 1.5 GHz·km at an operating wavelength $\lambda$ of between 0.8 µm and 1.4 µm.

6. The method of claim 4, wherein the relative refractive index difference $\Delta$ is 0.009 or greater and transmission bandwidth is greater than 3 GHz·km at an operating wavelength $\lambda$ of between 0.8 µm and 1.3 µm.

7. A communication method by means of wavelength division multiplexing technology, comprising the steps of:
   providing a graded-index multimode fiber according to the method of claim 4; and
   communicating by means of wavelength division multiplexing using the graded-index multimode fiber.

8. The method of claim 4, wherein wavelength division multiplexed data is transmitted on the formed graded-index multimode fiber.

9. A method of manufacturing a graded-index multimode fiber suitable for transmission of wavelength division multiplexed data, comprising:
   forming a core comprising silica glass, the core comprising a central region and an outer peripheral region; and
   forming a cladding at an outer periphery of the core;
   wherein the central region of the core contains at least one of germanium and phosphorus, and the outer peripheral region of the core contains fluorine, and $$n(r) = \begin{cases} n_1[1 - F(r)]^{1/2} & (0 \leq r \leq a) \\ n_1[1 - F(a)]^{1/2} & (r > a) \end{cases}$$

$$F(r) = \sum_{i=1}^{2} 2\Delta_i \left(\frac{r}{a}\right)^{\alpha_i}$$

$$\alpha_i = 2 - 2\frac{n_1}{N_1}\frac{\lambda}{\Delta_i}\frac{d\Delta_i}{d\lambda} - \frac{12}{5}\Delta$$

wherein F is a fiber shape function, $\Delta=\Delta_1+\Delta_2$, $n_1$ is a refractive index at the center of the core, $N_1$ is a group index at the center of the core, "a" is a core radius, $\lambda$ is a wavelength, $\Delta_i$ is a relative refractive index difference at the center of the core with respect to the cladding for each of the refractive index profiles, and i =1 or 2 representing germanium or fluorine.

10. A method of manufacturing a graded-index multimode fiber suitable for transmission of wavelength division multiplexed data, comprising:
   forming a core comprising silica glass, the core comprising a central region and an outer peripheral region; and
   forming a cladding at an outer periphery of the core;
   wherein the central region of the core contains at least one of germanium and phosphorus, and the outer peripheral region of the core contains fluorine, and
   the manufactured graded-index multimode fiber has a refractive index profile which satisfies the following:

$$n(r) = \begin{cases} n_1[1 - F(r)]^{1/2} & (0 \leq r \leq a) \\ n_1[1 - F(a)]^{1/2} & (r > a) \end{cases}$$

$$F(r) = \begin{cases} 2\Delta_1 \left(\frac{r}{a_0}\right)^{\alpha_1} & r < a_0 \\ 2\Delta_2 \left(\frac{r}{a}\right)^{\alpha_2} & a_0 \leq r \leq a \end{cases}$$

$$n_1^2 \left[1 - 2\Delta_2 \left(\frac{a_0}{a}\right)^{\alpha_2}\right] = n_0^2$$

$$n_1^2 [1 - 2\Delta_1] = n_0^2$$

wherein n(r) is a refractive index of the fiber at a distance "r" from the center of the core, $n_1$ is a refractive index at the center of the core, $\Delta_1$ is a maximum relative refractive index difference of one of germanium and phosphorus contained in the central region of the core with respect to the cladding, $\Delta_2$ is a maximum relative refractive index difference of fluorine contained in the central region of the core with respect to the cladding, "a" is a core radius, and $\alpha_1$ is a refractive index profile exponential parameter of the one of germanium and phosphorus contained in the central region of the core, $\alpha_2$ is a refractive index profile exponential parameter of fluorine contained in the outer peripheral region of the core, $a_0$ is a distance between the central and outer peripheral regions of the core, and $n_0$ is a refractive index of pure silica.

\* \* \* \* \*